United States Patent
Nagata et al.

(10) Patent No.: US 8,233,117 B2
(45) Date of Patent: Jul. 31, 2012

(54) WAVELENGTH SEPARATOR, PLANAR ILLUMINATION DEVICE AND LIQUID CRYSTAL DISPLAY DEVICE USING THE WAVELENGTH SEPARATOR

(75) Inventors: Takayuki Nagata, Osaka (JP); Hiroshi Obi, Kanagawa (JP); Shinichi Kadowaki, Hyogo (JP); Kazuhisa Yamamoto, Osaka (JP); Tatsuo Itoh, Osaka (JP); Shinichi Shikii, Nara (JP)

(73) Assignee: Panasonic Corporation, Osaka (JP)

( * ) Notice: Subject to any disclaimer, the term of this patent is extended or adjusted under 35 U.S.C. 154(b) by 753 days.

(21) Appl. No.: 12/358,715

(22) Filed: Jan. 23, 2009

(65) Prior Publication Data

US 2009/0190072 A1 Jul. 30, 2009

Related U.S. Application Data

(60) Provisional application No. 61/101,237, filed on Sep. 30, 2008.

(30) Foreign Application Priority Data

Jan. 23, 2008 (JP) ................... 2008-012264
Apr. 11, 2008 (JP) ................... 2008-103316
Nov. 26, 2008 (JP) ................... 2008-301055

(51) Int. Cl.
*G02F 1/1335* (2006.01)
(52) U.S. Cl. .................... 349/96; 349/105; 349/106
(58) Field of Classification Search .................... None
See application file for complete search history.

(56) References Cited

U.S. PATENT DOCUMENTS

| 5,650,865 | A | 7/1997 | Smith | |
|---|---|---|---|---|
| 6,774,963 | B1 * | 8/2004 | Nakao et al. | 349/104 |
| 7,400,439 | B2 * | 7/2008 | Holman | 359/298 |
| 7,903,200 | B2 * | 3/2011 | Misono et al. | 349/65 |
| 2003/0190126 | A1 | 10/2003 | Toyoshima et al. | |
| 2005/0105014 | A1 * | 5/2005 | Hong | 349/65 |
| 2006/0115213 | A1 | 6/2006 | Maeda et al. | |
| 2007/0147083 | A1 * | 6/2007 | Hwang | 362/613 |
| 2007/0279727 | A1 | 12/2007 | Gandhi et al. | |
| 2010/0103347 | A1 * | 4/2010 | Mizuuchi et al. | 349/64 |

FOREIGN PATENT DOCUMENTS

| GB | 2 260 203 | 4/1993 |
|---|---|---|
| JP | 9-80419 | 3/1997 |
| JP | 9-113903 | 5/1997 |

(Continued)

OTHER PUBLICATIONS

International Search Report issued May 12, 2009 in the International (PCT) Application No. PCT/JP2009/000218.

(Continued)

*Primary Examiner* — Richard Kim
(74) *Attorney, Agent, or Firm* — Wenderoth Lind & Ponack, L.L.P.

(57) ABSTRACT

A liquid crystal display device includes a reflective color filter arranged to intersect with an optical path of light emerging from a principal surface of a light guide plate, and a recycle portion arranged at a side of the light guide plate opposite to the reflective color filter. Out of light incident on the light guide plate, light reflected by the reflective color filter is returned to the reflected color filter again by being reflected by the recycle portion via the light guide plate.

41 Claims, 19 Drawing Sheets

FOREIGN PATENT DOCUMENTS

| | | |
|---|---|---|
| JP | 10-253955 | 9/1998 |
| JP | 3078750 | 8/2000 |
| JP | 2000-241812 | 9/2000 |
| JP | 2002-72010 | 3/2002 |
| JP | 2006-12722 | 1/2006 |
| JP | 2006-185891 | 7/2006 |
| JP | 2007-41555 | 2/2007 |
| JP | 2008-170979 | 7/2008 |

OTHER PUBLICATIONS

Extended European Search Report issued Dec. 16, 2011 in European Patent Application No. 09 70 3560, which is a foreign counterpart of the present application.

* cited by examiner

WAVELENGTH SEPARATOR, PLANAR ILLUMINATION DEVICE AND LIQUID CRYSTAL DISPLAY DEVICE USING THE WAVELENGTH SEPARATOR

This application claims the benefit of U.S. Provisional Application No. 61/101,237 filed Sep. 30, 2008.

BACKGROUND OF THE INVENTION

1. Field of Technology

The present invention relates to a wavelength separator used in a non-emissive display device such as a liquid crystal television and back-lighted sign boards, and high-luminance planar illumination device and liquid display device using this wavelength separator and a laser light source.

2. Description of the Background Art

A liquid crystal display device adopts a method for displaying an image by controlling a transmission amount of light irradiated from behind utilizing an electrooptic effect by the orientation of liquid crystal molecules. A general liquid crystal display device includes a planar illumination device called a backlight unit formed by fluorescent display tubes.

In recent years, screens of such liquid display devices have become larger and display devices for televisions of 50 inches and larger have been put to practical use. However, since power consumption has also been increased as screens have become larger, technological development for realizing lower power consumption is hoped for and it is strongly demanded to thin display devices in order to maximally reduce indoor spaces taken up by display devices.

In order to deal with lower power consumption and a thinner construction, it has been studied to use light-emitting diodes and lasers with good emission efficiency as light sources, and planar illumination devices using LEDs as light sources and liquid crystal display device using LEDs as light source have been already put to practical use.

For example, Japanese Unexamined Patent Publication No. 2006-185891 discloses a construction in which a diffractive optical element is formed on a side surface of a light guide plate, LED light is incident on this side surface and reflected by an inclined reflecting plate formed on one principal surface of the light guide plate and light with little luminance non-uniformity is emitted via a prism sheet arranged on another principal surface.

In order to realize low power consumption, it has been also studied to improve the transmittance of liquid crystal panels, which has been conventionally about 5%. Polarizing plates and color filters can be cited as key factors to reduce transmittance in liquid crystal panels. Normally, if unpolarized white light is incident on a liquid crystal panel, a transmission amount is reduced to ½ in a polarizing plate and further reduced to ⅓ of the reduced transmission amount in a color filter since any one of red light (R light), green light (G light) and blue light (B light) is selected in each filter region and passes through the filter region.

A construction for inserting a polarization reflection sheet between a liquid crystal panel and a backlight unit has been put to practical use as a method for improving transmittance in a polarizing plate. Specifically, the polarization reflection sheet transmits necessary polarized light components while reflecting unnecessary polarized light components. The light reflected by the polarization reflection sheet has the polarization thereof rotated to be converted into effective polarized light components for recycling.

As a method for improving transmittance in a color filter, a liquid crystal display device for effectively condensing irradiated light separated into R light, G light and B light by a wavelength separating means such a diffraction grating to specified pixels of a liquid crystal panel is proposed, for example, Japanese Unexamined Patent Publications No. 2000-241812, No. H09-113903 and No. H10-253955.

Further, a construction for performing wavelength separation into R light, G light and B light by an interference filter type mirror having wavelength selectivity and formed in a light guide plate and efficiently guiding these R light, G light and B light to specified pixels of a liquid crystal panel is proposed in Japanese Unexamined Patent Publication No. 2006-12722.

Besides, improvements of color filters themselves have been studied and there have been proposed color filters different from conventional absorptive color filters. For example, a color filter constructed such that thickness is partially changed for each region in a film structure of an interference filter to provide a different spectral characteristic for each region has been proposed in Japanese Unexamined Patent Publication No. 2008-170979. Color reproducibility is improved by this color filter.

Further, a color filter using a subwavelength grating is proposed in Japanese Unexamined Patent Publication No. 2007-41555. This subwavelength grating is a diffraction grating having a periodic structure shorter than light wavelength. There has been known a phenomenon in which, if light is incident on such a periodic structure, only light of a certain specific wavelength resonates to be strongly reflected. By using a manufacturing method (nano-imprinting) for pressing a mold with a microscopic convexo-concave pattern of nano scale (nm scale) against a material to be processed, a thin color filter having a large area and formed with a subwavelength grating can be manufactured at a low price and with high throughput.

However, no specific construction for reducing power consumption is disclosed or effect is insufficient in the above conventional constructions.

Although the efficiency of the light source is improved by using the LEDs in Japanese Unexamined Patent Publication No. 2006-185891, no specific construction for improving the transmittance of the liquid crystal panel is disclosed.

Although the construction for performing wavelength separation using diffraction and guiding light to the respective pixels of the liquid crystal panel is disclosed in Japanese Unexamined Patent Publications No. 2000-241812, No. H09-113903 and No. H10-253955, efficiency is not sufficiently improved and a further improvement in efficiency is difficult.

Specifically, in Japanese Unexamined Patent Publications No. 2000-241812 and No. H09-113903, grating pitch needs to be reduced to about several fold of wavelength for separation into R light, G light and B light by diffraction angle differences of about several degrees. If such a construction is employed, it becomes difficult to sufficiently improve diffraction efficiency.

Further, since a volume hologram is used in Japanese Unexamined Patent Publication No. H10-253955, wavelength separation is possible by specified angle differences. However, since an incident angle on the volume hologram is limited, the efficiency of light emerging from the light guide plate is reduced.

Although the construction in which the mirror for performing wavelength separation is formed in the light guide plate is disclosed in Japanese Unexamined Patent Publication No. 2006-12722, the light guide plate of such a structure is difficult to manufacture and costly.

The color filters disclosed in Japanese Unexamined Patent Publications No. 2008-170979 and 2007-41555 are only used in place of the conventional absorptive color filters and do not have largely different light utilization efficiency. Both color filters function as reflective color filters, but no construction for effectively utilizing the reflected light is disclosed.

SUMMARY OF THE INVENTION

An object of the present invention is to provide a low power consuming and thin wavelength separator, a planar illumination device and a liquid crystal display device using the wavelength separator.

One aspect of the present invention is directed to a wavelength separator, comprising a light guide plate for emitting light incident on a side surface thereof from one principal surface; a reflective color filter arranged to intersect with an optical path of the light emerging from the principal surface and including at least two types of filter regions having different spectral characteristics; and a recycle portion arranged at a side of the light guide plate opposite to the reflective color filter, wherein, out of the light incident on the light guide plate, light reflected by the reflective color filter is returned to the reflective color filter again by being reflected by the recycle portion via the light guide plate.

Another aspect of the present invention is directed to a planar illumination device, comprising a light source for emitting light of at least three different wavelengths; and the above wavelength separator, wherein light emitted from the light source is incident on the side surface of the light guide plate.

Still another aspect of the present invention is directed to a liquid crystal display device, comprising a liquid crystal panel including a plurality of subpixels for transmitting light of specific wavelengths; and a backlight illumination device for illuminating the liquid crystal panel from behind, wherein the above planar illumination device is used as the backlight illumination device.

Further another aspect of the present invention is directed to a liquid crystal display device, comprising a light source for emitting light of at least three different wavelengths; the above wavelength separator for separating light from the light source according to wavelength; and a liquid crystal panel on which light emitted from the wavelength separator is incident from behind, wherein the liquid crystal panel includes a plurality of subpixels for transmitting light of specific wavelengths, and an inner polarizing plate disposed between the plurality of subpixels and the light guide plate, and an axis along extending directions of linear gratings of the reflective color filter and a transmission axis of the inner polarizing plate are located on the same plane.

According to the present invention, it is possible to provide a low power consuming and flat wavelength separator with high light utilization efficiency, and a planar illumination device and a liquid crystal display device using this wavelength separator.

BRIEF DESCRIPTION OF THE DRAWINGS

FIG. 1 are views showing a schematic construction of a planar illumination device according to a first embodiment of the invention, wherein FIG. 3 is a section enlargedly showing a part of FIG. 1C, FIG. 4 are schematic sections showing other forms of a recycle portion of the planar illumination device of the first embodiment, wherein FIG. 4B shows a construction example using a multistep reflective structure and FIG. 4C shows a construction example in which deflecting grooves are formed in a multistep reflective structure, FIG. 5 are views showing a schematic construction of another planar illumination device according to the first embodiment, wherein FIG. 5A is an entire perspective view of the planar illumination device and FIG. 5B is an entire plan view of the planar illumination device, FIG. 6 are schematic construction diagrams of a planar illumination device using a two-dimensional photonic crystal as a light guide plate according to the first embodiment, wherein FIG. 6B is an enlarged perspective view of a part VIB of FIG. 6A when viewed from above and FIG. 6C is a section along VIC-VIC of FIG. 6B, FIG. 7 are schematic views showing a liquid crystal display device according to a second embodiment of the invention, wherein FIG. 9 is a section showing a schematic construction of the liquid crystal display device according to the second embodiment, FIG. 10 are sections showing schematic constructions of other liquid crystal display devices according to the second embodiment, wherein FIG. 10A is a section showing the schematic construction of the liquid crystal display device and FIG. 10B is a section showing the schematic construction of the liquid crystal display device, FIG. 11 are views showing a schematic construction of a liquid crystal display device according to the second embodiment, wherein FIG. 11A is a perspective view diagrammatically showing the entire construction of the liquid crystal display device and FIG. 11B is a plan view of the liquid crystal display device, FIG. 12 are schematic construction diagrams showing a liquid crystal display device according to a third embodiment, wherein FIG. 12A is a section of the liquid crystal display device and FIG. 12B is a perspective view of a structure sheet and a diffusion sheet, FIG. 13 are schematic construction diagrams showing another liquid crystal display device according to the third embodiment, wherein FIG. 14 is a diagram showing a specific design example of a subwavelength grating according to a fourth embodiment, FIG. 15 are sections showing a schematic construction of a planar illumination device according to the fourth embodiment, wherein FIG. 15A is a section of the planar illumination device and FIG. 15B is a section diagrammatically showing the structure of a reflective color filter, FIG. 16 are sections showing a schematic construction of another planar illumination device according to the fourth embodiment, wherein FIG. 16A is a section of the planar illumination device and FIG. 16B is a section diagrammatically showing the structure of a reflective color filter, FIG. 17 are sections diagrammatically showing another construction of the reflective color filter shown in FIG. 16, wherein FIG. 17A is a section of a structure in which periodic structures are opposed to each other and FIG. 17B is a section of a structure in which the periodic structures are arranged at the opposite sides of a substrate, FIG. 18 are schematic views showing construction examples of the periodic structures of the reflective color filter according to the fourth embodiment, wherein FIG. 18A is a plan view of linear gratings and FIG. 1B is a plan view of two-dimensional gratings, FIG. 19 are sections showing a schematic construction of a planar illumination device according to a fifth embodiment, wherein FIG. 19A is a section of the planar illumination device and FIG. 19B is a section diagrammatically showing the structure of a reflective color filter, FIG. 20 are diagrams showing three structure examples of a reflective color filter 157 according to the fifth embodiment and characteristics thereof, wherein FIGS. 20B, 20D and 20F show spectral characteristics of the respective structures of FIGS. 20A, 20C and 20E, and FIG. 21 are diagrams showing the influence of symmetry of a film structure shown in FIG. 20C, wherein

DETAILED DESCRIPTION OF THE INVENTION

Figure 1A:
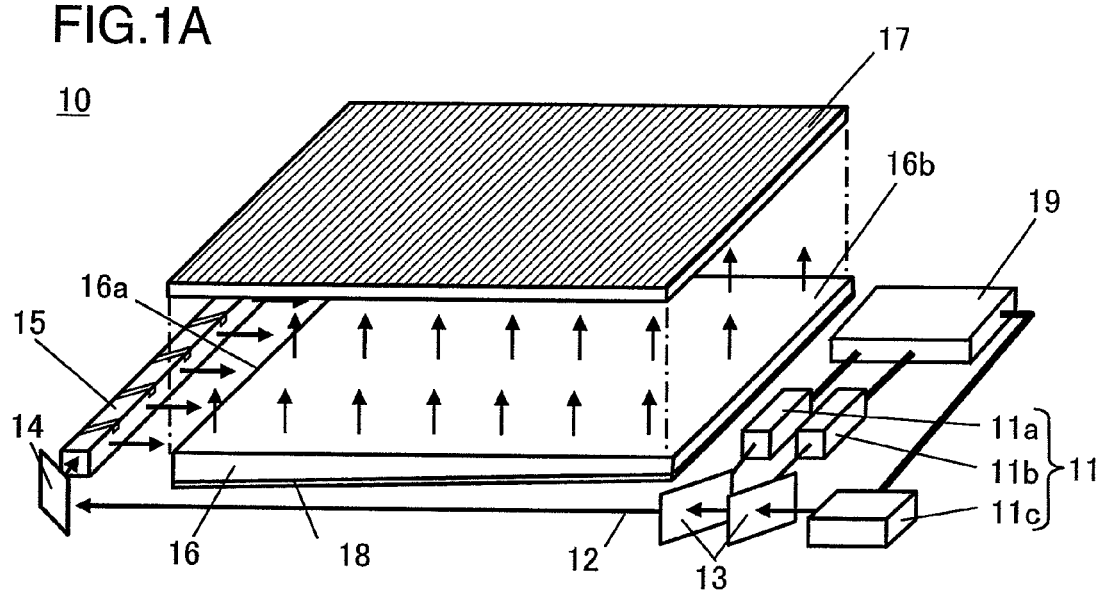
FIG. 1A is a perspective view diagrammatically showing the entire construction of the planar illumination device.

The following embodiments are merely specific examples of the present invention and are not of the nature to limit the technical scope of the present invention.

Hereinafter, embodiments of the present invention are described with reference to the drawings. It should be noted that the same elements are identified by the same reference numerals and may not be repeatedly described in some cases.

First Embodiment

Figure 1B:
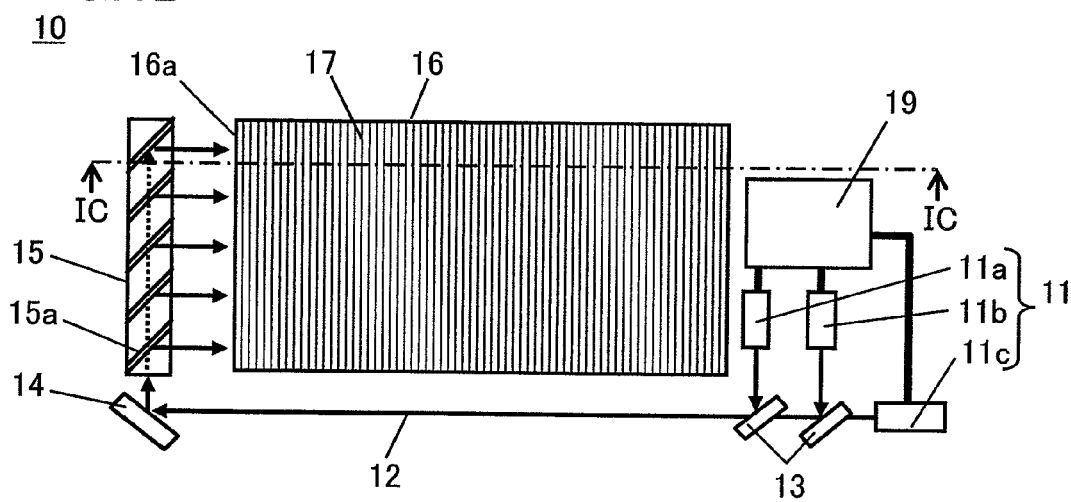
FIG. 1B is a plan view of the planar illumination device.
Figure 1C:
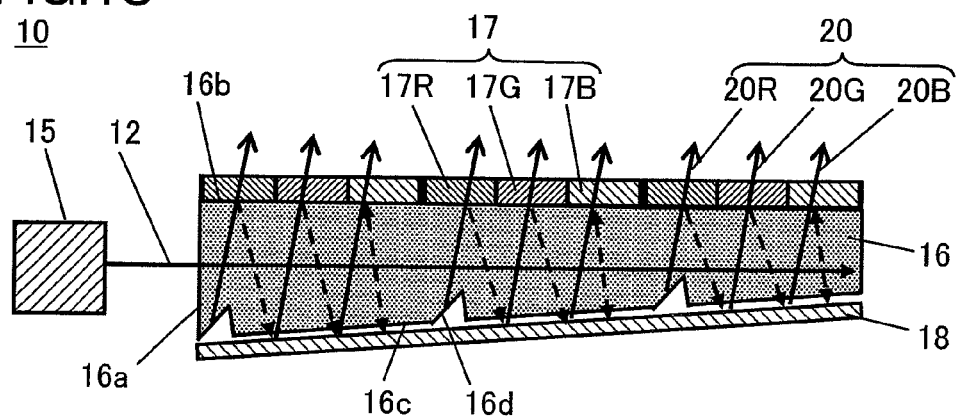
FIG. 1C is a section along IC-IC of FIG. 1B.

FIG. 1 are views showing a schematic construction of a planar illumination device according to a first embodiment of the present invention, wherein FIG. 1A is a perspective view diagrammatically showing the entire construction of the planar illumination device, FIG. 1B is a plan view of the planar illumination device and FIG. 1C is a section along IC-IC of FIG. 1B.

Although parts of the planar illumination device are shown to be separated in order to facilitate the understanding of the respective constructions in FIGS. 1A and 1B, they are placed on or within an unillustrated base plate or a frame in an actual construction to be entirely and integrally fixed.

Although a reflective color filter 17 is shown to be separated from a light guide plate 16 in order to facilitate the understanding of the construction, it is actually formed on a principal surface 16b of the light guide plate 16 as shown in FIG. 1C.

As shown in FIGS. 1A and 1B, a planar illumination device 10 according to this embodiment is provided with a laser light source 11 for emitting red laser light (hereinafter, "R light"), green laser light (hereinafter, "G light") and blue laser light (hereinafter, "B light"), a dichroic mirror 13 for combining the R, G and B lights emitted from the laser light source 11 into laser light 12, a mirror 14, a light guide bar 15 for converting the laser light 12 into linearly parallel light and emitting it, the light guide plate 16 having the laser light 12 emerging from the light guide bar 15 incident on a side surface 16a and adapted to emit it from one principal surface 16b, the reflective color filter 17 arranged on the principal surface 16b of the light guide plate 16, a recycle sheet 18 formed by a reflection sheet with a high reflectance and arranged adjacent to an opposed surface 16c of the light guide plate 16 opposed to the principal surface 16b and a controller 19 connected to the laser light source 11.

The laser light source 11 includes a red laser light source (hereinafter, "R light source") 11a for emitting R light, a green laser light source (hereinafter, "G light source") 11b for emitting G light and a blue laser light source (hereinafter, "B light source") 11c for emitting B light.

Here, each of the light sources 11a, 11b and 11c includes a collimator lens to emit parallel light therefrom. For example, high-output semiconductor lasers for emitting R light and B light having wavelengths of 640 nm and 445 μm are used as the R light source 11a and the B light source 11c and a high-output SHG laser of the semiconductor laser excitation type for emitting G light having a wavelength of 535 nm is used as the G light source 12b.

The light guide bar 15 is formed with a plurality of deflecting grooves 15a having inclined surfaces inclined substantially at 45° to a side surface thereof from which light emerges, so that light incident on the light guide bar 15 is deflected substantially by 90° by total reflection.

Figure 2:
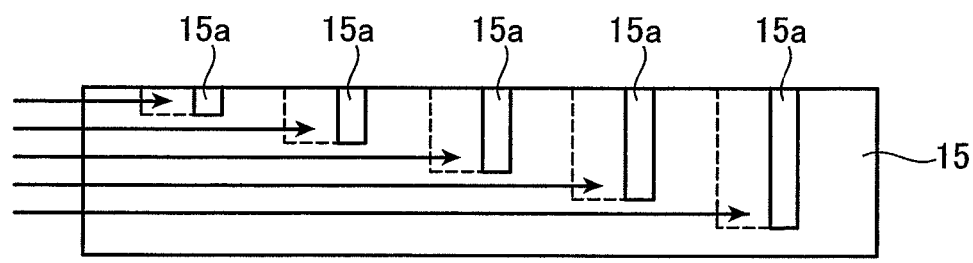
FIG. 2 is a side view enlargedly showing a light guide bar of FIG. 1.

Specifically, the depths of the respective deflecting grooves 15a are set to become larger from the front side toward the back side in a propagation direction of the laser light 12 as shown in FIG. 2. Thus, the laser light 12 not reflected by the deflecting groove 15a at the front side is reflected by any one of the deflecting grooves 15a arranged more backward than this deflecting groove 15a.

Further, as shown in FIG. 1C, the opposed surface 16c of the light guide plate 16 is formed with a plurality of deflecting grooves 16d having inclined surfaces inclined substantially at 45° to the principal surface 16b. The deflecting grooves 16d are formed to deflect light incident on the light guide plate 16 from the side surface 16a toward the principal surface 16b by totally reflecting this light.

The reflective color filter 17 includes R light filters 17R, G light filters 17G and B light filters 17B as three types of filter regions having different spectral characteristics.

Specifically, R light filters 17R transmit R light while reflecting G light and B light, the G light filters 17G transmit G light while reflecting R light and B light, and the B light filters 17B transmit B light while reflecting R light and G light. This reflective color filter 17 may be integrally formed on the principal surface 16b of the light guide plate 16.

A specific construction of the reflective color filter is not described in this embodiment since it is described in detail in fourth and fifth embodiments.

Next, the operation of the planar illumination device 10 of the first embodiment constructed as above is specifically described.

As shown in FIG. 1, the R light source 11a, G light source 11b and the B light source 11c respectively emit collimated R light, G light and B light. These R light, G light and B light are combined into laser light 12 by the dichroic mirror 13 and incident on the light guide bar 15 via the mirror 14. The laser light 12 incident on the light guide bar 15 is reflected by the plurality of deflecting grooves 15a such that a light quantity per unit area is uniform, and emerges from the light guide bar 15.

The laser light 12 emerging from the light guide bar 15 is incident on the side surface 16a of the light guide plate 16 in a direction substantially parallel to the principal surface 16b, and totally reflected by the deflecting grooves 16d formed in the opposed surface 16c of the light guide plate 16 to be deflected toward the principal surface 16b. The laser light 12 emerging from this principal surface 16b is incident on the reflective color filter 17.

Out of the laser light 12 incident on the reflective color filter 17, R light 20R passes through the R light filters 17R, G light 20G passes through the G light filters 17Q, B light passes through the B light filters 17B and other components of light are reflected. The R light 20R, G light 20G and B light 20B having passed through the reflective color filter 17 are collectively termed as emergent rays 20.

The laser light 12 reflected by the reflective color filter 17 passes through the light guide plate 16, is reflected by the recycle sheet 18 and passes through the light guide plate 16 again to return to the reflective color filter 17. Out of the light returned to the reflective color filter 17 in this way, only light components of corresponding colors incident on the specified filters 17R, 17G and 17B pass through the filters 17A, 17G and 17B, and other light components are reflected.

The light reflected again by the reflective color filter 17 is emitted as emergent rays 20 separated according to wavelength by the R light filters 17R, the G light filters 17G and the B light filters 17B while being repeatedly reflected between the reflective color filter 17 and the recycle sheet 18.

Accordingly, by employing the construction of the planar illumination device 10, the laser light 12 incident on the light guide plate 16 can be emitted while being separated according to wavelength by the respective filters 17R, 17G and 17B of the reflective color filter 17 and the light reflected by the reflective color filter 17 can also be uniformly emitted for the respective filters 17R, 17G and 17B by being recycled without any waste. In this way, a low power consuming and thin planar illumination device capable of wavelength separation can be realized.

In the planar illumination device 10, arbitrary luminance distribution and color distribution can be realized by providing a mirror region for reflecting all of R light, G light and B light in the reflective color filter 17 and by setting ratios of the widths of the respective filters 17R, 17G and 17B to that of the mirror region to be partly different, i.e. by setting the areas of the respective filters 17R, 17G and 17B in the reflective color filter 17 to be locally different. By such a construction, a still image can be illuminated with very low power consumption and high color reproducibility, wherefore a planar illumination device suitable for sign board illumination and the like can be realized.

Characteristics of the light guide plate 16 include luminance nonuniformity corresponding to a distance from the side surface 16a on which light is incident and color nonuniformity due to light absorption in the light guide plate 16. Accordingly, by setting the widths of the respective filters 17R, 17G and 17B to reduce this color nonuniformity, a uniform planar illumination device free from nonuniformity can be realized by the entire emergent surface. Further, by combining this planar illumination device and a liquid crystal panel and arranging the respective filters 17R, 17G and 17B in correspondence with pixels of the liquid crystal panel, a very low power consuming and thin liquid crystal display device can be realized.

In this embodiment, a deflection direction of the laser light 12 deflected by the deflecting grooves 16d of the light guide plate 16 is slightly inclined with respect to a direction orthogonal to the principal surface 16b of the light guide plate 16. Thus, the laser light 12 is guided to different positions of the reflective color filter 17 every time being reflected between the reflective color filter 17 and the recycle sheet 18.

Therefore, according to the planar illumination device 10, the laser light 12 can be successively incident on the respective filters 17R, 17G and 17B and can be separated according to wavelength without any waste by being recycled.

Here, if an deflecting angle by the deflecting grooves 16d of the light guide plate 16, an angle of inclination of a reflecting surface of the recycle sheet 18 and the thickness of the light guide plate 16 are properly set, most of light reflected by a specified filter (e.g. R light filter 17R) can be guided to a filter (e.g. G light filter 17G or B light filter 17B) different from the one last time.

Figure 3:
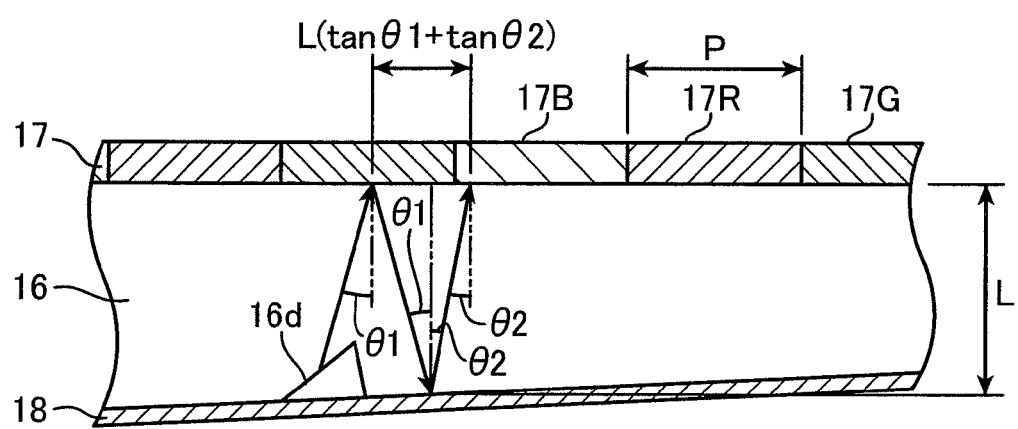

Specifically, as shown in FIG. 3, if an incident angle θ1 of the laser light 12 on the reflective color filter 17, an incident angle θ2 of the laser light 12 when being reflected by the filter region and the recycle sheet 18 to be incident on the reflective color filter 17 again, and a width P of the respective filters 17R, 17G and 17B are, for example, set to 1.3°, 0.7° and 200 µm, the laser light 12 reflected by the reflective color filter 17 can be guided to the filters different from those last time by setting the thickness of the light guide plate 16 to about 5.7 mm. This relationship is expressed by the following equation:

$$L = m \times P / (\tan\theta_1 + \tan\theta_2) \text{ (}m\text{ is an integer other than multiples of 3).}$$

By employing such a construction, light can be emitted while being efficiently separated according to wavelength by a smaller number of recycles, wherefore a low cost and low power consuming planar illumination device can be realized.

If the value of m in the above equation is approximated to a multiple of 3, the number of recycles can be increased. By such a construction, the laser light 12 can be reflected a plurality of times between the reflective color filter 17 and the recycle sheet 18. Therefore, the uniformity of light emitted from the planar illumination device can be improved.

In this embodiment, the reflecting surface of the recycle sheet 18 is inclined with respect to the reflective color filter 17. Thus, every time the laser light 12 is reflected between the reflective color filter 17 and the recycle sheet 18, the incident angle of the laser light 12 on the reflective color filter 17 becomes closer to a right angle. If the laser light 12 further repeats recycle reflections, it is incident on the reflective color filter 17 in a direction inclined toward a side opposite to an initial side and propagates in a direction (direction toward the side surface 16a) opposite to an incident direction on the light guide plate 16.

Hence, according to the above construction, in-plane uniformity of the laser light 12 can be improved by reflecting the laser light 12 between the reflective color filter 17 and the recycle sheet 18 to widen the laser light 12 along the principal surface of the light guide plate 16. Further, by causing the emergent rays 20 to emerge in directions substantially perpendicular to the reflective color filter 17, an emergent angle variation of the emergent rays 20 can also be reduced, wherefore a planar illumination device for emitting substantially parallel light can be realized. If a viewing angle is adjusted using a prism sheet or a diffusion sheet, a good luminance angle distribution can be realized.

Alternatively, although the reflecting surface of the recycle sheet 18 is a flat surface inclined with respect to the principal surface 16b of the light guide plate 16 in this embodiment, this inclined surface may be a part of a curved surface or may be formed like a diffusing surface.

Although the recycle sheet 18 is formed with the inclined surface in this embodiment, the opposed surface 16c of the light guide plate 16 or the reflective color filter 17 may be formed into an inclined surface inclined with respect to the principal surface 16b of the light guide plate 16.

By such a construction, every time the reflection of the laser light 12 between the reflective color filter 17 and the recycle sheet 18 is repeated, the incident direction and the incident angle of the laser light 12 on the reflective color filter 17 change, whereby the laser light 12 is uniformly widened and the emergent angle of the laser light 12 from the reflective color filter 17 is widened in a wide range. Therefore, a planar illumination device for emitting divergent light with a uniform luminance distribution can be realized.

Further, although the recycle sheet 18 is used as the recycle portion in this embodiment, this recycle portion may be a reflective structure having a reflective coating on a bottom surface.

Figure 4A:
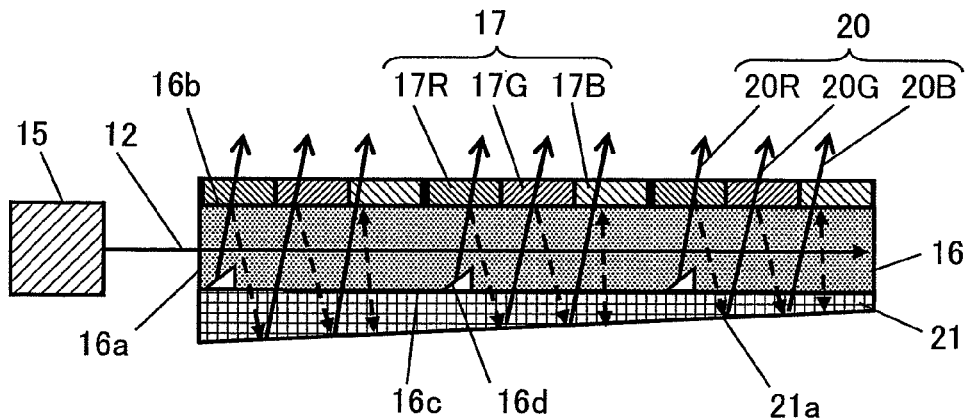
FIG. 4A shows a construction example using a wedge-shaped reflective structure.
Figure 4B:
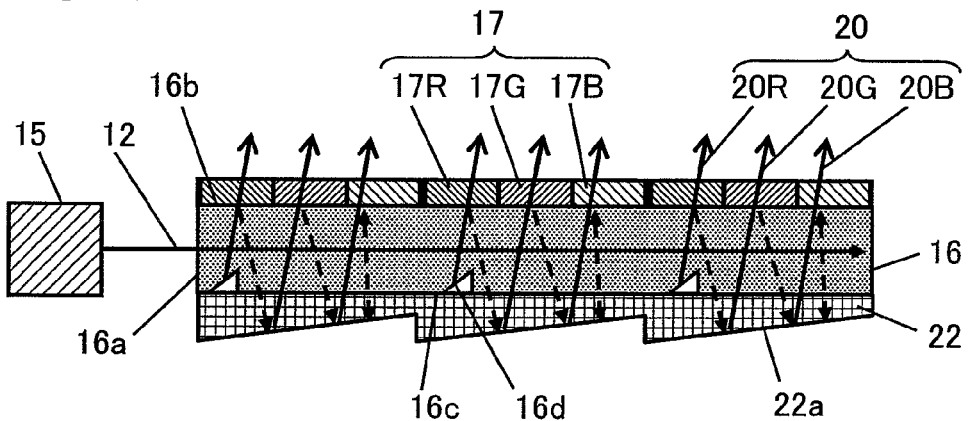
Figure 4C:
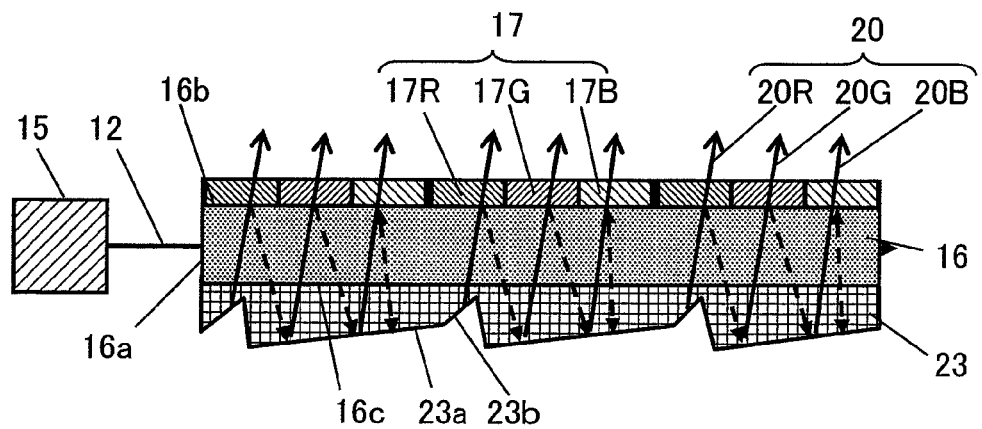

FIG. 4 are schematic sections showing other forms of the recycle portion of the planar illumination device 10 of the first embodiment, wherein FIG. 4A shows a construction example using a wedge-shaped reflective structure, FIG. 4B shows a construction example using a multistep reflective structure and FIG. 4C shows a construction example in which deflecting grooves are formed in a multistep reflective structure.

What FIG. 4 differ from FIG. 1C is that the opposed surface 16c of the light guide plate 16 is formed to be substantially parallel to the principal surface 16b, that the deflecting grooves 16d are not formed in the light guide plate 16 in FIG. 4C and that recycle sheets (reflective structures 21 to 23) different from the recycle sheet 18 are employed. Other constituent elements are identified by the same reference numerals and not described.

In FIG. 4A, the light guide plate 16 is in the form of a flat plate and the deflecting grooves 16d are formed in the opposed surface 16c. Further, a wedge-shaped reflective structure 21 made of a transparent base material is arranged adjacent to the opposed surface 16c of the light guide plate 16.

A surface of the reflective structure 21 opposite to the light guide plate 16 serves as a reflecting surface 21a for reflecting the laser light 12 reflected by the reflective color filter 17. If the reflective structure 21 is mounted on the opposed surface 16c of the light guide plate 16 in this way, the deflecting grooves 16d can be sealed by the reflective structure 21 and, therefore, dust deposition in the deflecting grooves 16d and the like can be suppressed.

FIG. 4B shows a construction using a reflective structure 22 having a multistep structure instead of the reflective structure 21 of FIG. 4A. A surface of the reflective structure 22 opposite to the light guide plate 16 serves as a reflecting surface 22a for reflecting the laser light 12 reflected by the reflective color filter 17. By such a construction, the thickness of a thickest part can be reduced as compared with the case where the recycle portion has a wedge shape and an angle of inclination of the reflecting surface 22a can be freely set. Therefore, a degree of freedom in designing is improved.

FIG. 4C shows a reflective structure 23 having a multistep structure and arranged adjacent to the opposed surface 16c of the light guide plate in the form of a flat plate. Reflecting surfaces 23a for reflecting the laser light 12 reflected by the reflective color filter 17 and deflecting grooves 23b adjacent to these reflecting surfaces 23a are formed on a surface of the reflective structure 23 opposite to the light guide plate 16.

The deflecting grooves 23b are formed to deflect the laser light 12 incident on the light guide plate 16 toward the principal surface 16b. By such a construction, the planar illumination device can have a thin construction and a degree of freedom in designing can be improved.

Since the light guide plate 16 is in the form of a flat plate in the mode shown in FIG. 4C, the reflective structures 21 to 23 can be made of resin and the light guide plate 16 can be a glass substrate.

Here, since displacements of the respective filters 17R, 17G and 17B due to thermal expansion can be suppressed by forming the reflective color filter 17 on the glass substrate, it is suitable, for example, for a large-screen planar illumination device having strict positioning accuracy. Particularly, in the case of combining the planar illumination device and a liquid crystal panel, relative displacements of the respective color filters 17R, 17G and 17B and subpixels of the liquid crystal panel can be reduced by conforming a coefficient of thermal expansion of the glass substrate used for the reflective color filter 17 and that of a glass substrate used for the liquid crystal panel to each other.

Although the respective filters 17R, 17G and 17B of the reflective color filter 17 and the deflecting grooves 16d of the light guide plate 16 are arranged in correspondence in FIGS. 1 and 4, these arrangements may not necessarily correspond.

Although the laser light sources are used in the embodiment shown in FIG. 1, it is also possible to use LEDs as light sources.

Figure 5A:
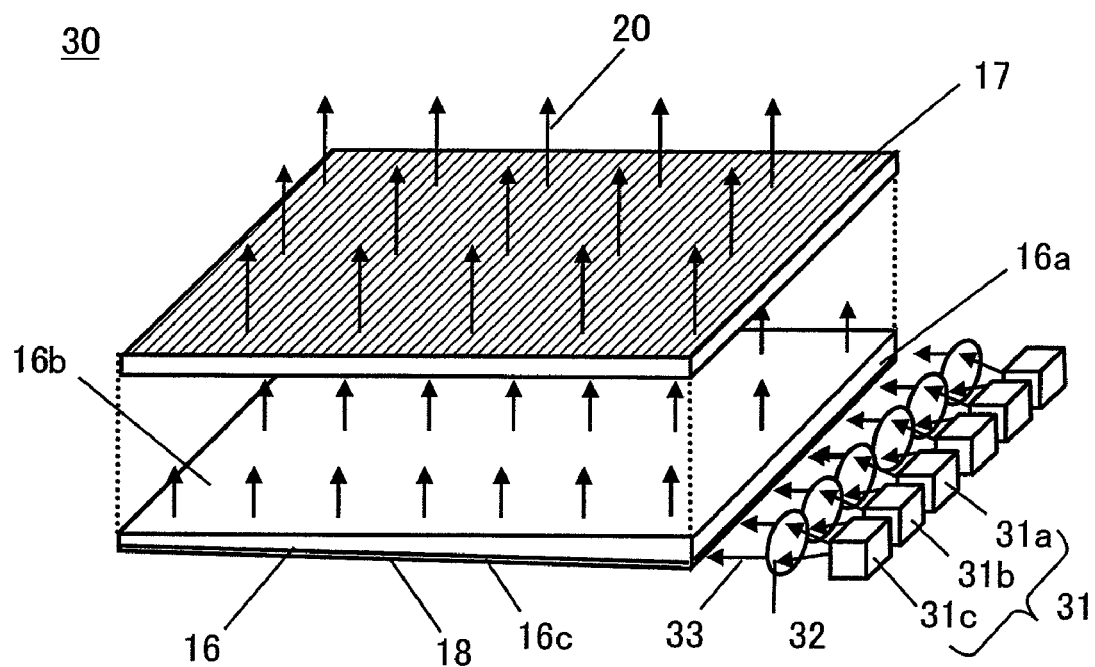
Figure 5B:
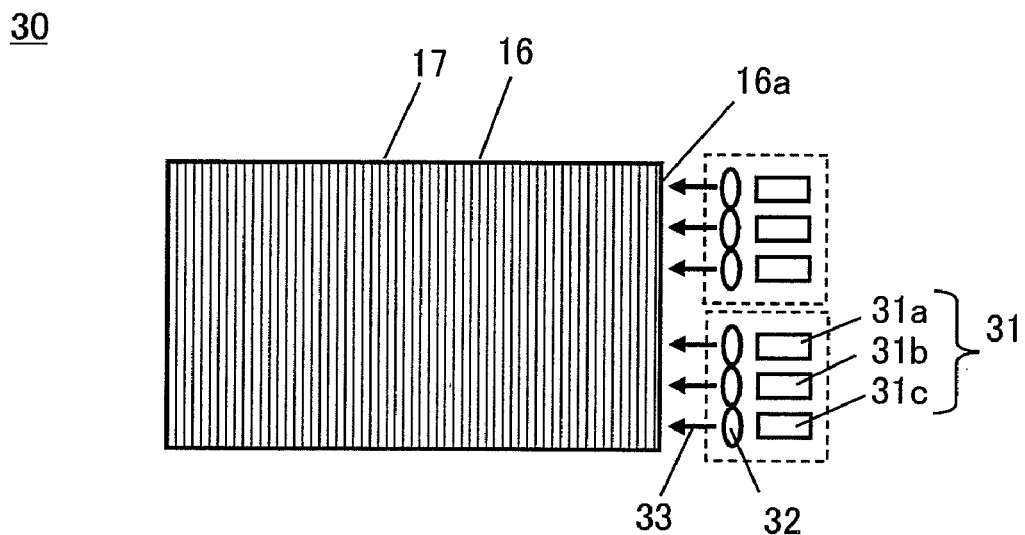

FIG. 5 are views showing a schematic construction of another planar illumination device according to the first embodiment of the present invention, wherein FIG. 5A is a perspective view of the entire planar illumination device and FIG. 5B is a plan view of the entire planar illumination device. The same constituent elements as in FIG. 1 are identified by the same reference numerals and not described.

As shown in FIGS. 5A and 5B, a planar illumination device 30 is provided with a LED light source 31, a collimator lens 32 for collimating R light, G light and B light emitted from the LED light source 31, a light guide plate 16 having irradiation light 33 irradiated from the LED light source incident on a side surface 16a and adapted to emit it from a principal surface 16b, a reflective color filter 17 arranged on the principal surface 16b of the light guide plate 16, and a recycle sheet 18 arranged adjacent to an opposed surface 16c of the light guide plate 16 opposed to the principal surface 16b.

The LED light source 31 includes red LEDs 31a for emitting R light, green LEDs 31b for emitting G light and blue LEDs 31c for emitting B light.

In the planar illumination device 30 constructed as above, irradiation light 33 emitted from the red LEDs 31a, the green LEDs 31b and the blue LEDs 31c are incident on the light guide plate 16 after being collimated for the respective LEDs.

The light incident on the light guide plate 16 is emitted as emergent rays 20 separated according to wavelength by the respective filters 17R, 17G and 17B from the reflective color filter 17 while being repeatedly reflected between the reflective color filter 17 and the recycle sheet 18 similar to the construction shown in FIG. 1.

In this way, even if the LED light source 31 is used as the light source, irradiation light 33 from the LED light source 31 can be separated according to wavelength by being recycled without any waste. Thus, a low power consuming and thin planar illumination device can be realized. Further, by arranging a multitude of LEDs to form a linear light source, an optical system for converting light into linear light such as a light guide bar becomes unnecessary. Therefore, a cost reduction can be promoted.

As another construction using a LED light source, a multitude of LEDs may be arranged on a plane to form a planar illumination device. By employing such a construction, light utilization efficiency can be further improved since so-called local dimming technology can be utilized.

Although the reflective color filter 17 separates three color lights of R light, G light and B light according to wavelength in this embodiment, it is not necessary to possess three types of filters 17R, 17G and 17B. A planar illumination device for emitting light of three wavelengths can be constructed by providing at least two types of filter regions.

For example, light of three different wavelengths can emerge from separate regions by combining a reflective color filter having two types of filter regions and a fluorescent material. Specifically, a light source for emitting light of two wavelengths including B light is employed, and a part of the B light separated by the reflective color filter is wavelength converted by arranging the fluorescent material in a region the part of the B light passes. In this way, three lights, i.e. the B light, the light obtained by wavelength converting the B light and light from the light source separated from the B light by the reflective color filter can be emitted.

Alternatively, light of three wavelengths emitted from a light source can be separated by combining a reflective color filter having two types of filter regions and another separating means.

Further, in such an application capable of displaying by light of two wavelengths and a mixture thereof, a light source for emitting light of two wavelengths and a reflective color filter having two types of filter regions can be used.

The above constructions are simplified and the number of manufacturing steps can be reduced since it is sufficient for the reflective color filter to have two types of filter regions. For example, in the case of constructing a reflective color filter using subwavelength gratings for allowing only light of specific wavelengths to undergo resonant reflection by microscopic periodic structures, two or more layers need to be laminated in the case of separating light of three wavelengths, but the reflective color filter can be constructed by one layer in the case of separating light of two wavelengths. Thus, the number of operation steps can be reduced.

Further, in the case of constructing a reflective color filter by an interference filter for realizing a different spectral characteristic for each region by partly changing the thickness for each filter region, a process of repeating sputtering and etching is necessary to change the thickness for each filter region. At this time, etching needs to be performed twice to provide three steps in the case of forming three types of filter regions, but it is sufficient to perform etching once in the case of forming two types of filter regions since it is sufficient to provide two steps. Therefore, the number of operation steps can be reduced.

Although linear light is incident on the side surface 16a of the light guide plate 16 in this embodiment, light may be incident at one position of the side surface of the light guide plate. Such a construction can be realized, for example, by integrally forming the light guide bar 15 and the light guide plate 16.

The construction for causing light to be incident at one position of the side surface of the light guide plate can be realized by using a photonic crystal in which materials having different refractive indices are two-dimensionally and periodically arranged.

Figure 6A:
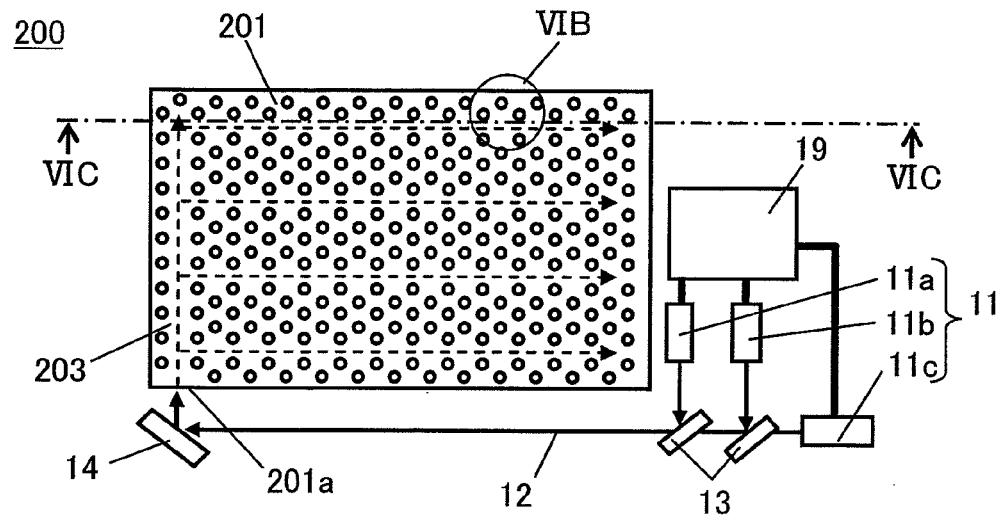
FIG. 6A is a plan view of the planar illumination device.
Figure 6B:
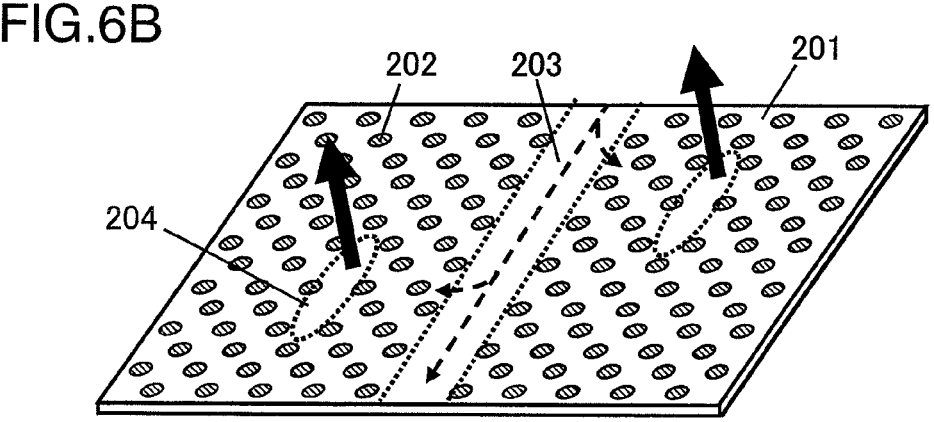
Figure 6C:
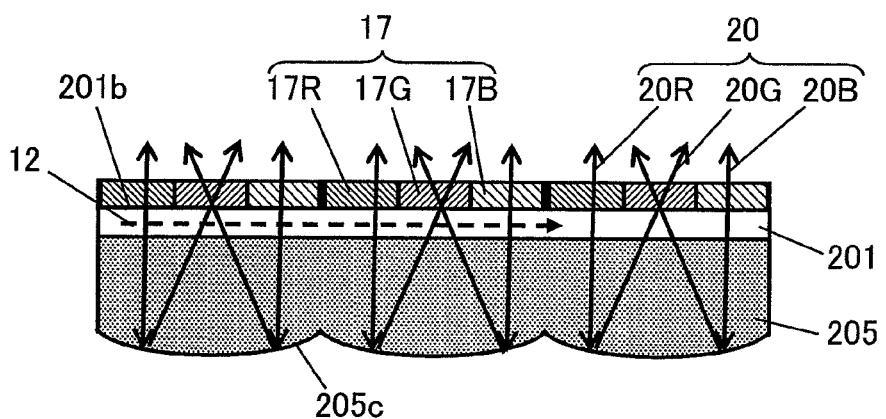

FIG. 6 are schematic construction diagrams of a planar illumination device 200 using a two-dimensional photonic crystal as the light guide plate according to the first embodiment of the present invention, wherein FIG. 6A is a plan view of the planar illumination device, FIG. 6B is an enlarged perspective view of a part VIB of FIG. 6A when viewed from above and FIG. 6C is a section along VIC-VIC of FIG. 6B.

The reflective color filter 17 is not shown in FIG. 6A in order to facilitate the understanding of the construction.

The planar illumination device 200 shown in FIG. 6 is provided with a slab-like light guide plate 201 whose thickness is sufficiently smaller than a dimension in an in-plane direction, a reflective color filter 17 provided on one principal surface 201b (upper surface in FIG. 6) of the light guide plate 201, and a reflective structure 205 provided on the other principal surface (lower surface in FIG. 6) of the light guide plate 201.

The light guide plate 201 includes a region where different refractive index portions 202 having a refractive index different from that of a main body of the light guide plate 201 are periodically arranged and defect portions having a destroyed periodic structure by partially increasing or decreasing the number of different refractive index portions.

In the region where the different refractive index portions 202 are periodically arranged, a photonic band gap is formed and light of a specific wavelength cannot be present. Thus, if light of the specific wavelength is incident on the light guide plate 201, it is present only in and near the defect portions. Accordingly, if a defect portion is formed to be linear, this linear defect portion 203 serves as a waveguide. Further, dot-shaped defect portions 204 serve as emitting portions for collecting light, which cannot be present around them, and emitting light in a direction perpendicular to the principal surface 201b of the light guide plate 201.

The different refractive index portions 202 can be easily formed by perforating through holes in the main body of the light guide plate 201.

In this construction, if laser light 12 is incident on an incident surface 201 of the light guide plate 201, it propagates to every corner of the light guide plate 201 by the waveguide formed by the linear defect portion 203 and emerges from the principal surface 201b of the light guide plate 201 in a direction substantially perpendicular to the principal surface 201b via the dotted defect portions 204 scattered around the linear defect portion 203.

The laser light 12 emerging from the light guide plate 201 is repeatedly reflected between the reflective color filter 17 and a reflecting surface 205c of the reflective structure 205 and eventually passes through the specified filters 17R, 17G and 17B to be emitted from the planar illumination device 200.

If the reflecting surface 205c of the reflective structure 205 is, for example, a cylindrical surface as shown in FIG. 6C, the laser light 12 can be uniformly widened in the reflective structure 205 and emergent rays 20 can be emitted substantially perpendicularly to the principal surface 201b.

Even if such a construction is employed, a planar illumination device capable of efficiently performing wavelength separation for each of the respective filters 17R, 17G and 17B can be realized. Since the light guide plate can be very thin in this construction, an even thinner planar illumination device can be realized.

Second Embodiment

Figure 7A:
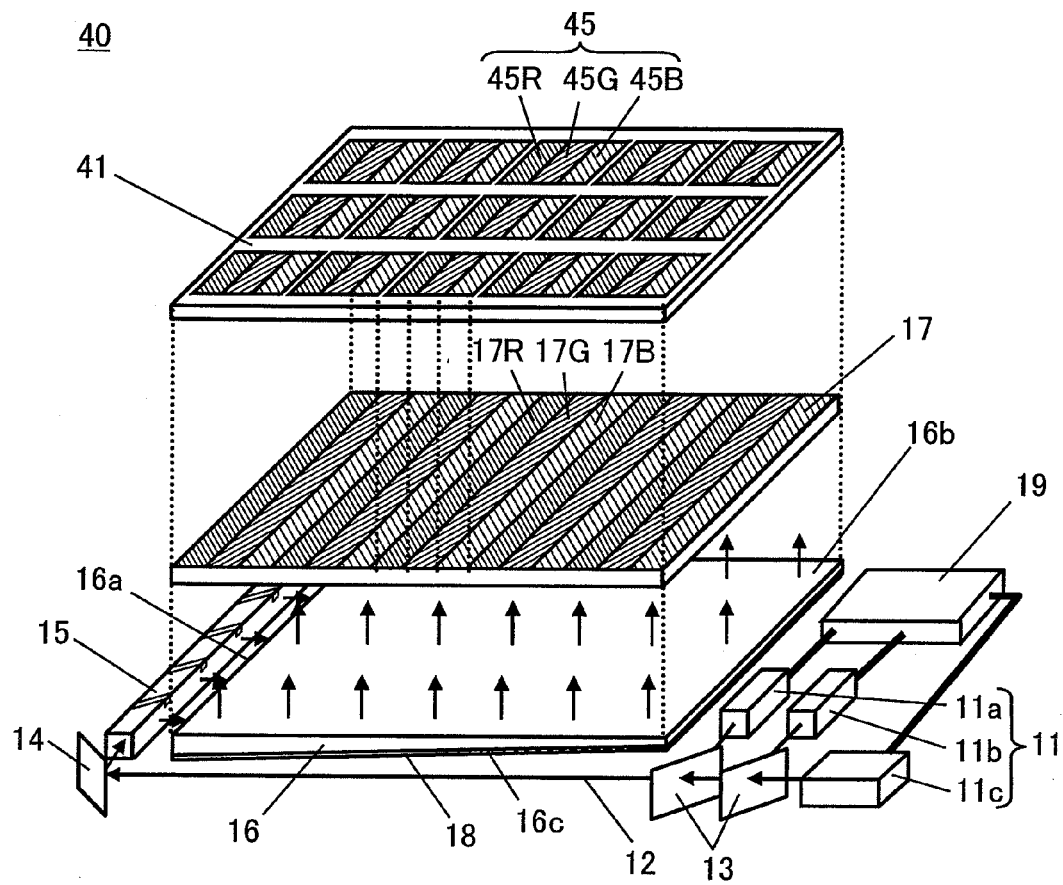
FIG. 7A is a perspective view diagrammatically showing the entire construction of the liquid crystal display device and FIG. 7B is a plan view of the liquid crystal display device.
Figure 7B:
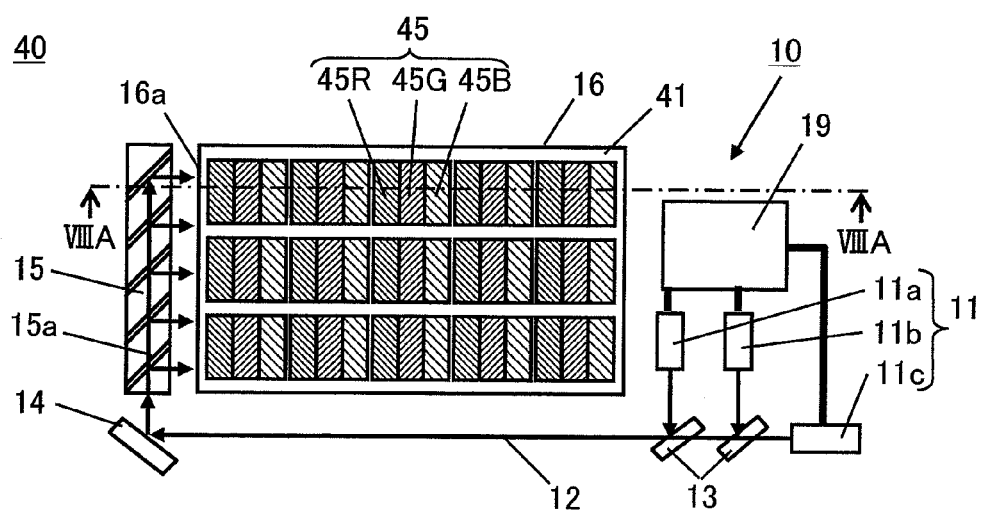

FIG. 7 are schematic views showing a liquid crystal display device according to a second embodiment of the invention, wherein FIG. 7A is a perspective view diagrammatically showing the entire construction of the liquid crystal display device and FIG. 7B is a plan view of the liquid crystal display device.

Although parts of the planar illumination device are shown to be separated in order to facilitate the understanding of the respective constructions in FIGS. 7A and 7B, they are placed on or within an unillustrated base plate or a frame in an actual construction to be entirely and integrally fixed.

Figure 8:
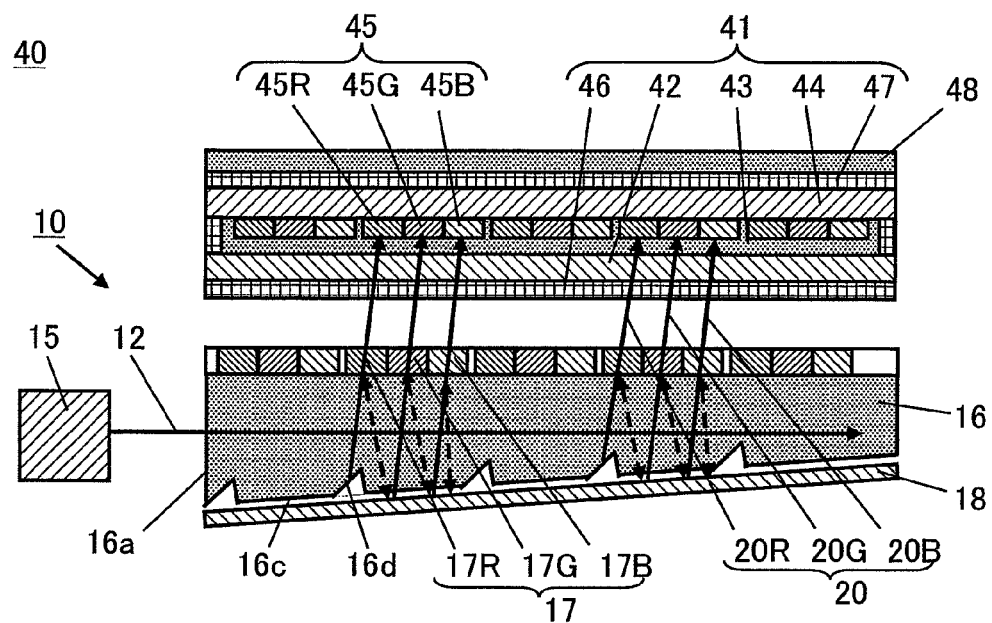
FIG. 8 is schematic section along VIIIA-VIIIA of FIG. 7B showing the liquid crystal display device according to the second embodiment.

As shown in FIGS. 7A and 7B, the liquid crystal display device 40 according to the second embodiment is provided with a liquid crystal panel 41, a backlight illumination device for illuminating the liquid crystal panel 41 from behind, e.g.

the planar illumination device 10 described in the first embodiment, and a diffusion sheet 48 (see FIG. 8).

FIG. 8 is a schematic section along VIIIA-VIIIA of FIG. 7B showing the liquid crystal display device 40 according to the second embodiment. As shown in FIG. 8, the diffusion sheet 48 is arranged adjacent to an emergent surface of the liquid crystal panel 41.

In this construction, R light, G light and B light emitted from a laser light source 11 are incident on a light guide plate 16 with polarization directions thereof aligned in a direction parallel or perpendicular to a principal surface 16b of the light guide plate 16 in a planar illumination device 10 according to this embodiment.

Deflecting grooves 16d of the light guide plate 16 extend in a direction (direction orthogonal to the plane of FIG. 8) parallel to a side surface 16a so as to reflect laser light 12 incident in a direction substantially parallel to the principal surface 16b substantially at right angles toward the principal surface 16b.

As shown in FIG. 8, the liquid crystal panel 41 includes two glass substrates 42, 44, a liquid crystal layer 43 disposed between the glass substrates 42 and 44, a TFT (thin film transistor: not shown) formed on one of the glass substrates 42 and 44, an incident side polarizing plate 46 provided on a surface of the glass substrate 42 opposite to the liquid crystal layer 43 and an emergent side polarizing plate 47 provided on a surface of the glass substrate 44 opposite to the liquid crystal layer 43.

This liquid crystal panel 41 is of the transmissive type or the semi-transmissive type. Specifically, the liquid crystal panel 41 includes a multitude of pixels 45 each comprised of an R subpixel 45R, a G subpixel 45G and a B subpixel 45B. Each of the subpixels 45R, 45G and 45B includes an absorptive color filter for transmitting any one of R light, G light and B light and absorbing light of other wavelengths.

Here, the respective subpixels 45R, 45G and 45B of the liquid crystal panel 41 and regions of filters 17R, 17G and 17B of a reflective color filter 17 are arranged in correspondence. Specifically, the respective subpixels 45R, 45G and 45B are arranged to repeat in the order of R, G and B in a lateral direction, and the subpixels of the same colors are respectively longitudinally arranged. On the other hand, the regions of the respective filters 17R, 17G and 17B of the reflective color filter 17 extend in a longitudinal direction, are arranged in the same color order of the respective subpixels 45R, 45G and 45B at the same intervals in the lateral direction and have a stripe shape.

The diffusion sheet 48 is formed to diffuse light emerging from the respective subpixels 45R, 45G and 45B by a convexo-concave pattern or a microlens array formed on a surface thereof. The diffusion sheet 48 may also be formed to diffuse light by refraction or reflection by diffusing beads contained inside the diffusion sheet 48.

In the liquid crystal display device 40 thus constructed, R light, G light and B light emitted from a R light source 11a, a G light source 11b and a B light source 11c while having the polarization directions thereof aligned are collimated for the respective light sources, and combined into laser light 12 by a dichroic mirror 13.

The laser light 12 is incident on a light guide bar 15 via a mirror 14, and deflected in a direction substantially perpendicular to the side surface 16a of the light guide plate 16 by a plurality of deflecting grooves 15a while maintaining the polarization thereof, thereby being incident on the side surface 16a of the light guide plate 16. The laser light 12 incident on the light guide plate 16 is reflected in a direction substantially perpendicular to the principal surface 16b of the light guide plate 16 by deflecting grooves 16d formed in an opposed surface 16c and emerges from the principal surface 16b to reach the reflective color filter 17.

The laser light 12 having reached the reflective color filter 17 passes through the corresponding ones of the respective filters 17R, 17G and 17B of the reflective color filter 17 while being repeatedly reflected between the reflective color filter 17 and the recycle sheet 18, and emerges as emergent ray 20.

Here, if a polarization direction of the laser light 12 incident on the light guide plate 16 is perpendicular to the principal surface 16b of the light guide plate 16, the polarization is maintained before and after reflection by the deflecting grooves 16d and the light with the aligned polarization emerges from the light guide plate 16 since normals to reflecting surfaces of the deflecting grooves 16d are located on the same plane as a polarizing surface for the incident light. Further, since the polarization is also maintained during the succeeding multiple reflections, the emergent rays 20 are those with the aligned polarization and emerge while being polarized in a transverse direction of FIG. 7B.

Even if the polarization of laser light incident on the light guide plate 16 is parallel to the principal surface 16b, it is possible to maintain the polarization. In this case, the emergent rays 20 emerge while being polarized in a vertical direction of FIG. 7B.

The emergent rays 20 emerging from the reflective color filter 17 are incident on the incident side polarizing plate 46 in the form of linearly polarized rays. At this time, if the polarization direction of the emergent rays 20 and a transmission axis of the incident side polarizing plate 46 coincide, most of the emergent rays 20 pass through the incident polarizing plate 46, wherefore high light utilization efficiency can be obtained.

The emergent rays 20 incident through the incident side polarizing plate 46 of the liquid crystal panel 41 with high efficiency are incident on the respective subpixels 45R, 45G and 45B of the pixels 45, modulated by the liquid crystal layer 43 and incident on the absorptive color filters of the respective subpixels.

At this time, the emergent rays 20 are separated into R light, G light and B light by the respective filters 17R, 17G and 17B of the reflective color filter 17 arranged to correspond to the respective subpixels 45R, 45G and 45B. Since the separated R light 20R, G light 20G and B light 20B are incident on the liquid crystal panel 41 substantially perpendicular thereto, they are respectively efficiently incident on the corresponding subpixels 45R, 45G and 45B.

Here, in a conventional construction which does not perform any wavelength separation, a probability that light having reached the pixels is incident on the subpixels 45R, 45G and 45B corresponding to the respective wavelengths is ⅓. The light not incident on the specified subpixels is absorbed by the absorptive color filters. Thus, the quantity of light emerging from the respective subpixels is ⅓ or less of that of the incident light.

On the other hand, the construction of this embodiment can obtain two to three times as high efficiency as this conventional construction since most of light of the specified wavelengths can be guided to the respective subpixels 45R, 45G and 45B.

The emergent rays 20 emerging from the respective subpixels 45R, 45G and 45B emerge from the emergent side polarizing plate 47 substantially perpendicularly to the surface of the emergent side polarizing plate 47 and diffused by the diffusion sheet 48, whereby an image with a wide viewing angle is displayed.

At this time, the emergent rays 20 pass through the liquid crystal layer 43 substantially perpendicularly to widen the viewing angle on an image display screen of the liquid crystal panel 41. Thus, high contrast equivalent to the one obtained when seen from front can be obtained even when being seen in an oblique direction.

As described above, in this embodiment, the transmittance of the liquid crystal panel 41 can be improved since light with aligned polarization is emitted from the planar illumination device 10.

Further, since the incident side polarizing plate 46 for aligning the polarization direction of the light incident on the liquid crystal panel 41 can be dispensed with according to this embodiment, a lower power consuming and low cost liquid crystal display device can be realized.

Further, a loss in the absorptive color filters in the liquid crystal panel 41 can be reduced since wavelength separation is performed for the respective filters 17R, 17G and 17B in the planar illumination device 10 and light of specified wavelengths can be incident on the respective subpixels 45R, 45G and 45B.

Since the absorptive color filters can also be dispensed with in the liquid crystal panel 41, a lower power consuming and lower cost liquid crystal display device can be realized.

By using the laser light sources 11a to 11c as the light sources, a thin liquid crystal display device with a wide color reproduction range, high luminance and little luminance non-uniformity can be realized. Further, high contrast can be obtained even when seen in an oblique direction.

The emergent rays 20 emerge from the light guide plate 16 substantially perpendicularly in this embodiment. If a variation of emergent angles of the emergent rays 20 is large, the percentage of light of the specified wavelengths being incident on the respective subpixels 45R, 45G and 45B of the liquid crystal panel 41 decreases.

Figure 9:
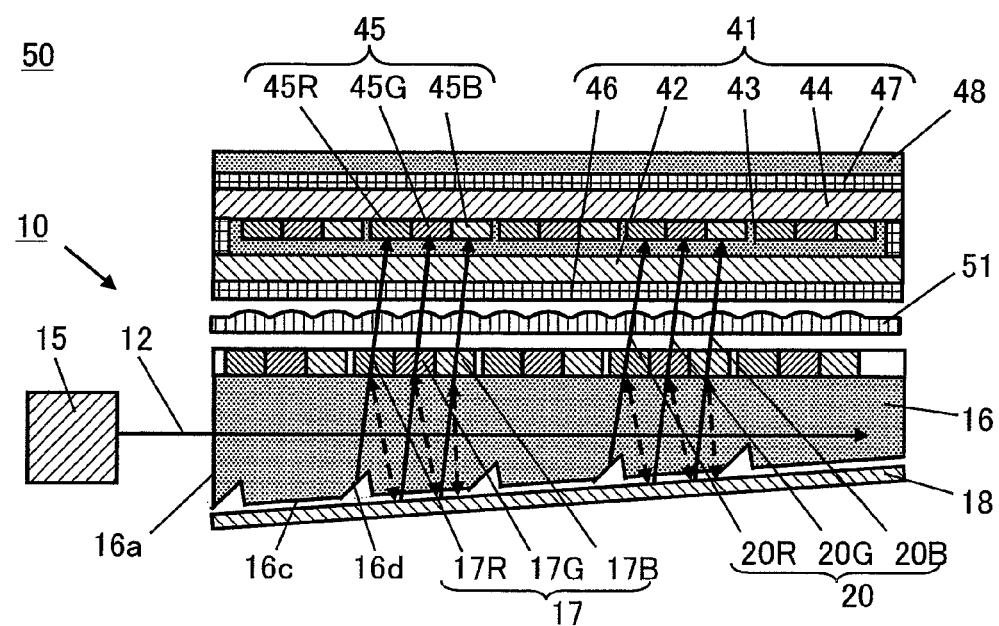

In such a case, a lens array 51 can be provided between the liquid crystal panel 41 and the light guide plate 16 as in a liquid crystal display device 50 shown in FIG. 9. By doing so, emergent rays 20 can be collimated or condensed to the respective subpixels 45R, 45G and 45B, wherefore the transmittance of the liquid crystal panel 41 can be improved.

Alternatively, incidence efficiency on the respective subpixels 45R, 45G and 45B can be improved also by locating the reflective color filter 17 and the pixels 45 of the liquid crystal panel 41 closer to each other. For example, as shown in FIG. 10, the reflective color filter 17 can be formed on the glass substrate 42 of the liquid crystal panel 41.

Figure 10A:
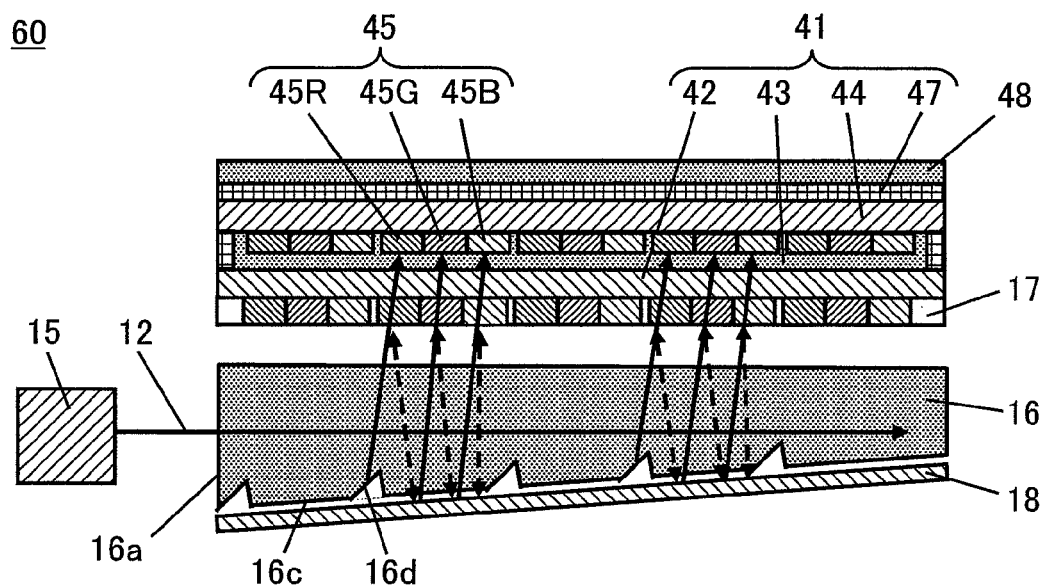
Figure 10B:
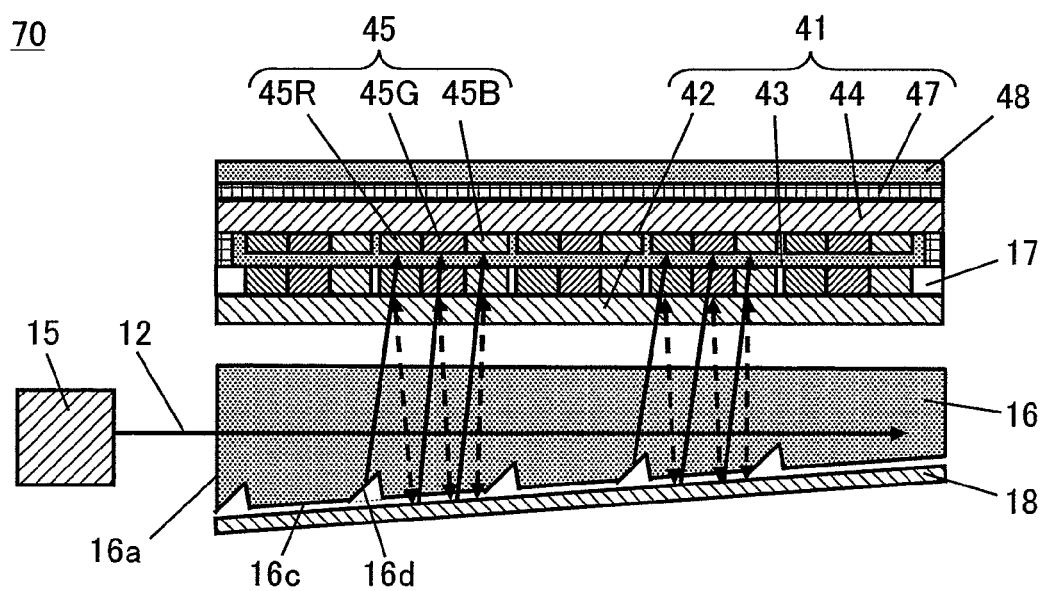

FIGS. 10A and 10B are schematic sections of other liquid crystal display devices according to the second embodiment of the present invention, wherein FIG. 10A is a section showing a schematic construction of a liquid crystal display device 60 and FIG. 10B is a section showing a schematic construction of a liquid crystal display device 70.

As shown in FIG. 10A, the incident side polarizing plate 46 (see FIG. 8) of the liquid crystal panel 41 is omitted by forming the reflective color filter 17 on a surface of the glass substrate 42 of the liquid crystal panel 41 toward the light guide plate 16 in the liquid crystal display device 60. The glass substrate 42 is made of the same material as the glass substrate 44.

By such a construction, it is possible not only to improve the transmittance of the liquid crystal panel 41, but also to suppress displacements of relative positions of the respective filters 17R, 17G and 17B of the reflective color filter 17 and the respective subpixels 45R, 45G and 45B of the liquid crystal panel 41 due to thermal expansion or the like. Therefore, a highly reliable liquid crystal display device can be realized.

As shown in FIG. 10B, the incident side polarizing plate 46 (see FIG. 8) of the liquid crystal panel 41 is omitted by forming the reflective color filter 17 on a surface of the glass substrate 42 of the liquid crystal panel 41 toward the liquid crystal layer 43 in the liquid crystal display device 70. The glass substrate 42 is made of the same material as the glass substrate 44.

By such a construction, reliability is improved since displacements of relative positions of the respective filters 17R, 17G and 17B and the respective subpixels 45R, 45G and 45B due to thermal expansion or the like can be suppressed as described above.

Further, in the liquid crystal display device 70, almost the entire light separated by the reflective color filter 17 can be incident on the specified subpixels 45R, 45G and 45B by shortening a distance between the reflective color filter 17 and the pixels 45 as compared with the liquid crystal display device 60. Therefore, a lower power consuming liquid crystal display device can be realized.

Although no incident side polarizing plate is provided in the liquid crystal panel 41 in the constructions shown in FIGS. 10A and 10B, there is a possibility that an extinction ratio of light incident on the liquid crystal panel 41 decreases to lead to reduced contrast if the laser light 12 incident on the light guide plate 16 has varying polarization or polarization is rotated while repeating recycle reflections by the birefringence of the light guide plate 16 or the like.

In such a case, a high quality image with high contrast can be displayed using a polarization reflection sheet for reflecting only specific polarized light components as the recycle sheet 18.

Although the laser light 12 is incident on the light guide plate 16 in a direction along the arrangement direction of the respective filters 17R, 17G and 17B of the reflective color filter 17 in this embodiment, it may be incident in a longitudinal direction of the respective filters of the reflective color filter 17 arranged in stripes.

Figure 11A:
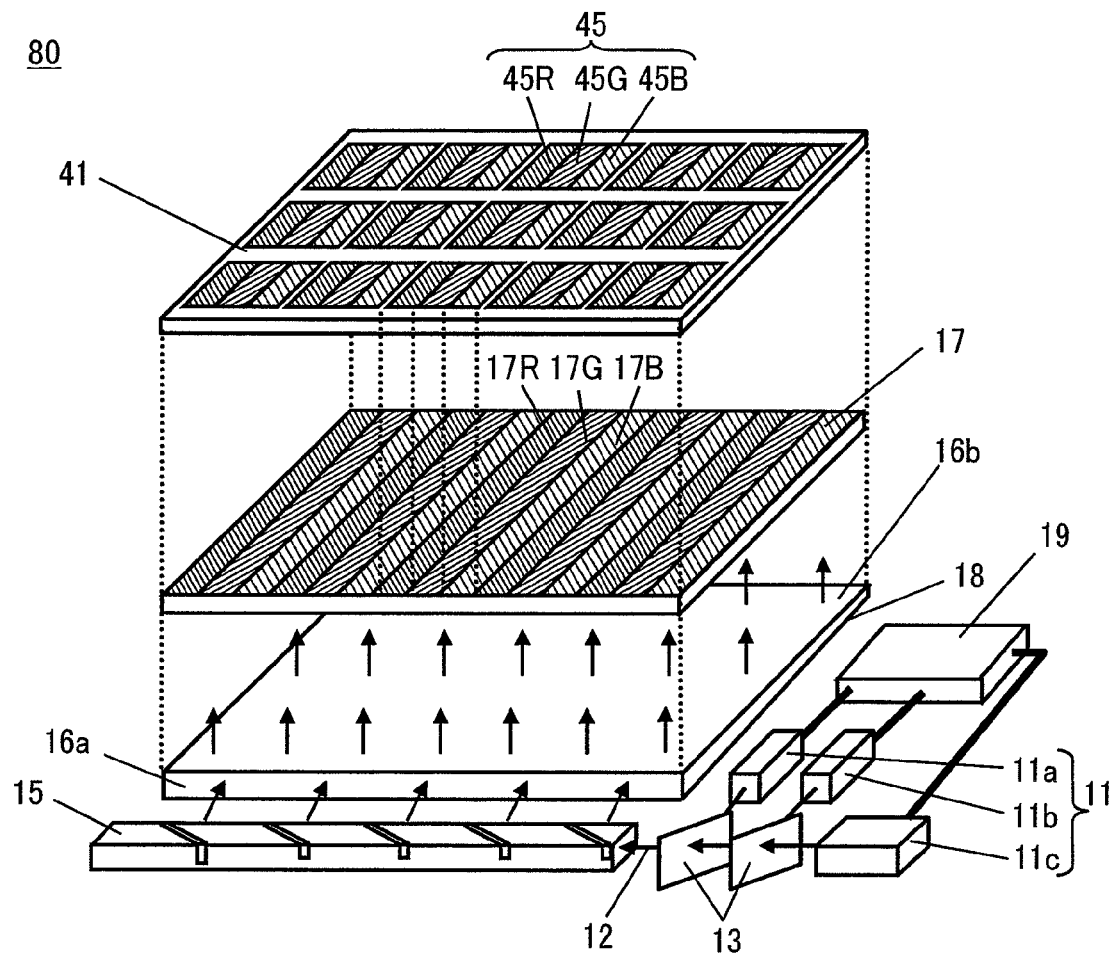
Figure 11B:
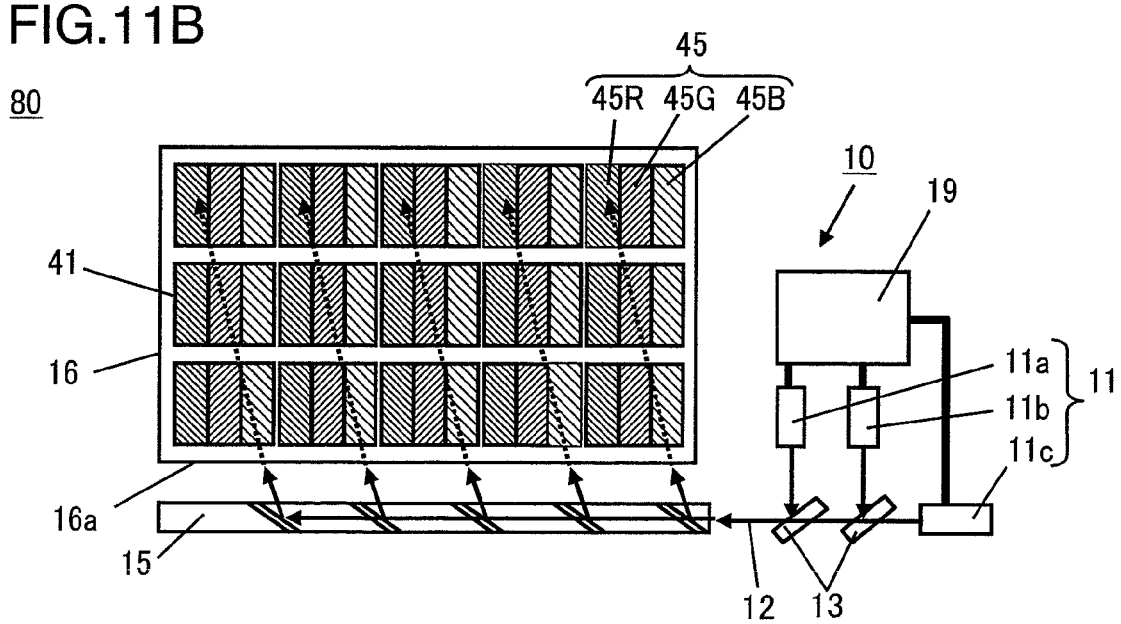

FIG. 11 are views showing a schematic construction of another liquid crystal display device according to the second embodiment of the present invention, wherein FIG. 11A is a perspective view diagrammatically showing the entire construction of the liquid crystal display device and FIG. 11B is a plan view of the liquid crystal display device.

What is different in FIG. 11 from the construction shown in FIG. 7 is only the incident direction of the laser light 12 on the light guide plate 16. In this mode, laser light 12 is incident on the light guide plate 16 along an optical path inclined by several degrees in a transverse direction of FIG. 8B with respect to a normal to the side surface 16a of the light guide plate 16.

In this mode, the laser light 12 incident on the light guide plate 16 is reflected substantially at right angles by the deflecting grooves 16d. Since the laser light 12 incident on the light guide plate 16 in such a manner as to be substantially parallel to the principal surface 16b of the light guide plate 16 propagates in the light guide plate 16 while being somewhat diffracted and slightly widened at the time of reflection by the deflecting grooves 16d, emergent angles of emergent rays 20 somewhat vary in the incident direction of the laser light 12 on the light guide plate 16.

Thus, in the construction in which the reflective color filter 17 and the pixels 45 of the liquid crystal panel 41 are arranged at a distance as shown in FIG. 8, the percentage of light of specified wavelengths being incident on the respective subpixels 45R, 45G and 45B of the liquid crystal panel 41 decreases.

However, if the construction as shown in FIG. 11 is employed, emergent angles of emergent rays 20R, 20G and 20B emerging from the reflective color filter 17 vary in a propagation direction of the laser light 12 in the light guide plate 16 (vertical direction in FIG. 11B), but have high parallelism in a direction (transverse direction in FIG. 11B) orthogonal to the propagation direction.

In other words, the emergent rays 20 having reached the respective subpixels 45R, 45G and 45B can be efficiently incident on the specified subpixels since being widened only in the direction in which the subpixels of the same colors extend. Thus, an even lower power consuming liquid crystal display device can be realized.

Further, since the laser light 12 is incident on the light guide plate 16 while being inclined by several degrees, the laser light 12 emerging from the light guide plate 16 does not return to the same filters as those last time upon returning to the reflective color filter 17 again by being reflected by the reflective color filter 17 and then by the recycle sheet 18.

Thus, light can be emitted while being separated according to wavelength by a smaller number of recycles. Therefore, an extremely low power consuming liquid crystal display device can be realized by suppressing even a slight efficiency loss during recycle reflections.

Further, the number of recycles can be increased when the laser light 12 is incident parallel to the longitudinal direction of the respective filters 17R, 17G and 17B of the reflective color filter. Therefore, more uniform light can be emitted.

Third Embodiment

Figure 12A:
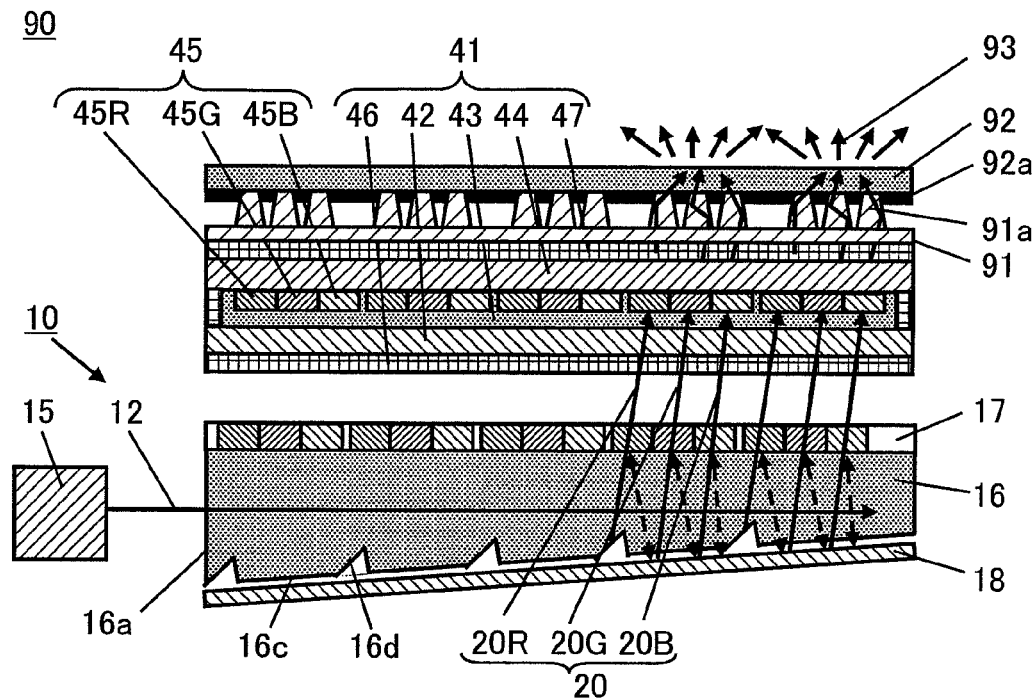
Figure 12B:
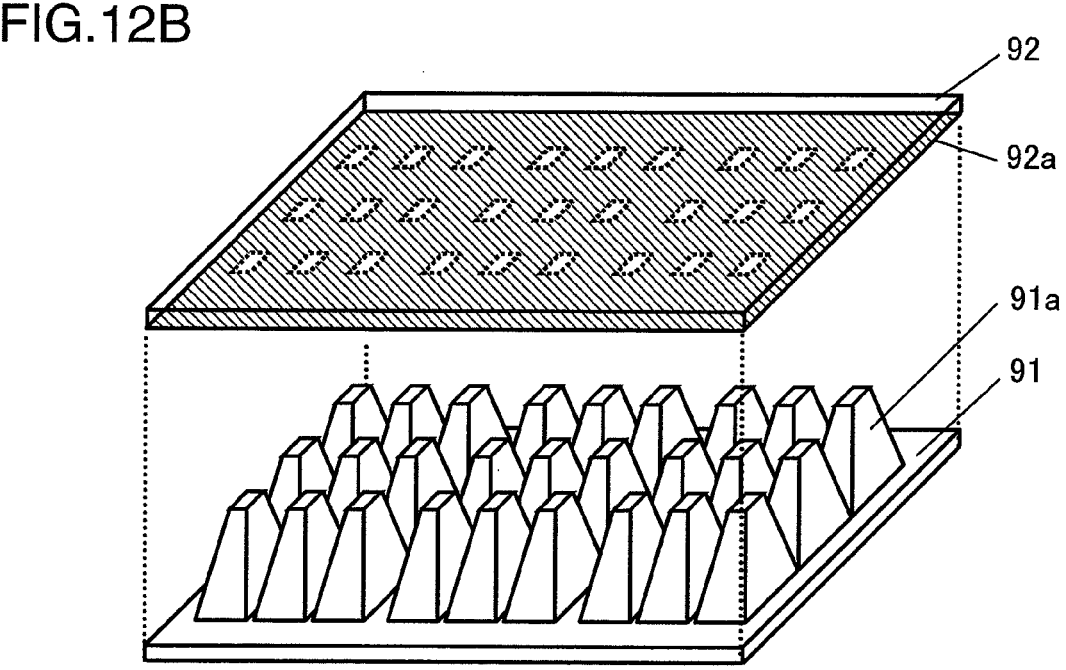

FIG. 12 are views showing a schematic construction of a liquid crystal display device 90 according to a third embodiment of the present invention, wherein FIG. 12A is a section of the liquid crystal display device and FIG. 12B is a perspective view of a structure sheet and diffusion sheet of FIG. 12A.

Although the structure sheet and the diffusion sheet are separated in order to facilitate the understanding in FIG. 12B, they are arranged in contact in an actual construction.

A liquid crystal display device 90 of the third embodiment shown in FIG. 12 differs from the liquid crystal display device 40 shown in FIG. 8 in that a structure sheet 91 is inserted between the emergent side polarizing plate 47 and a diffusion sheet 92 and black stripes 92a are provided. In FIG. 12, the same construction as the liquid crystal display device 40 of FIG. 8 are identified by the same reference numerals and not described.

As shown in FIGS. 12A and 12B, the structure sheet 91 includes tapered micro photoconductors 91a arranged in correspondence with the positions of R subpixels 45R, G subpixels 45G and B subpixels 45B of pixels 45.

The diffusion sheet 92 includes black stripes 92a provided in areas other than those corresponding to the top surfaces of the micro photoconductors 91a of the structure sheet 91 and adapted to absorb outside light.

By such a construction, emergent rays 20 emerging form a liquid crystal panel 41 are incident on the micro photoconductors 91a of the structure sheet 91. Parts of the rays incident on the microscopic photoconductors 91a have the propagation paths thereof bent by being totally reflected by side surfaces of the micro photoconductors 91a and further effectively diffused by the diffusion sheet 92 to be outputted as an image output 93 with a wide viewing angle from the liquid crystal display device 90.

In the case of diffusing light only by the diffusion sheet 92, a high haze is necessary to obtain a wide viewing angle. Such a construction has a so-called outstanding white problem of reducing contrast in a bright place by the reflection of outside light.

On the other hand, since light is diffused through the microscopic photoconductors 91a in the liquid crystal display device 90 according to this embodiment, the haze of the diffusion sheet 92 may be low and most of outside light can be absorbed by the black stripes 92a.

Thus, according to the liquid crystal display device 90, a liquid crystal display device capable of displaying an image with high contrast in a bright place, high luminance and a wide viewing angle can be realized.

Although the microscopic photoconductors 91a shown in FIG. 12 are rectangular in a cross section parallel to a video projecting surface, they may have another shape provided that incident surfaces on the microscopic photoconductors 91a can be arranged, leaving no space therebetween. For example, microscopic photoconductors 91a having a triangular or hexagonal cross section may be used.

If the microscopic photoconductors 91a have a circular cross section near the emergent surface, biases in diffusing directions can be reduced.

The structure sheet 91 may also be formed with a multitude of tapered holes instead of arranging the tapered microscopic photoconductors. In this case, if emergent rays 20 are reflected by the side surfaces of the tapered holes, effects similar to those of this embodiment can be obtained.

Although the microscopic photoconductors 91a have a tapered shape, effects similar to those of the microscopic photoconductors 91a can be obtained provided that the microscopic photoconductors 91a have such a shape as to largely diffuse substantially parallel incident light and narrow down the light to smaller areas at the emergent side than at the incident side.

Figure 13A:
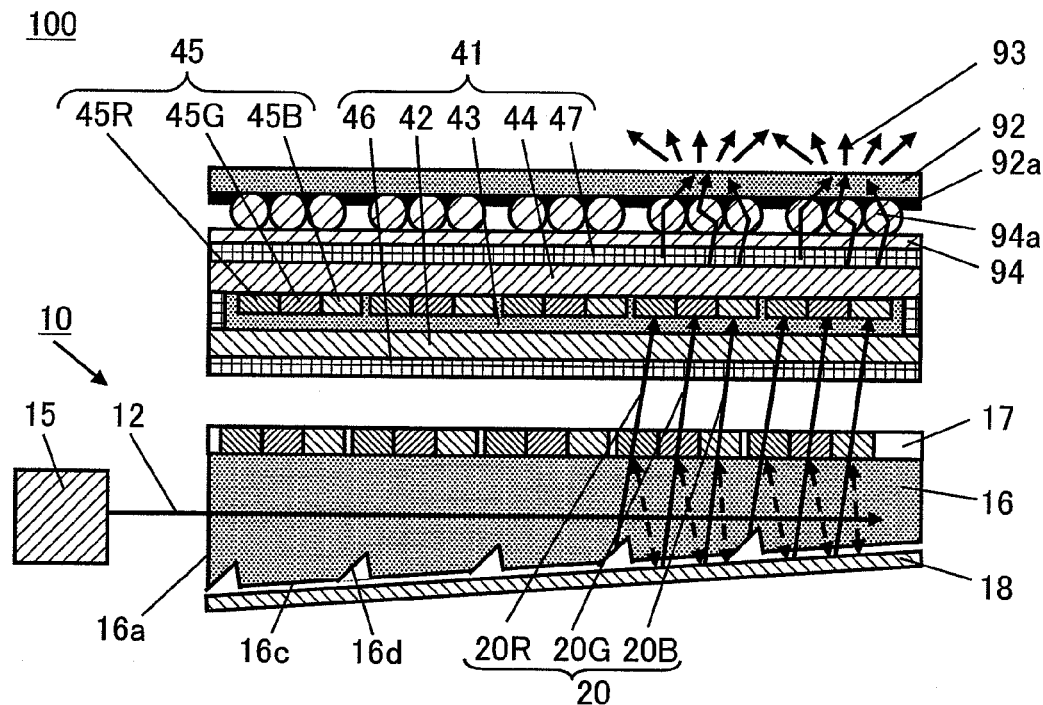
FIG. 13A is a section of the liquid crystal display device and FIG. 13B is a perspective view of a structure sheet and a diffusion sheet.
Figure 13B:
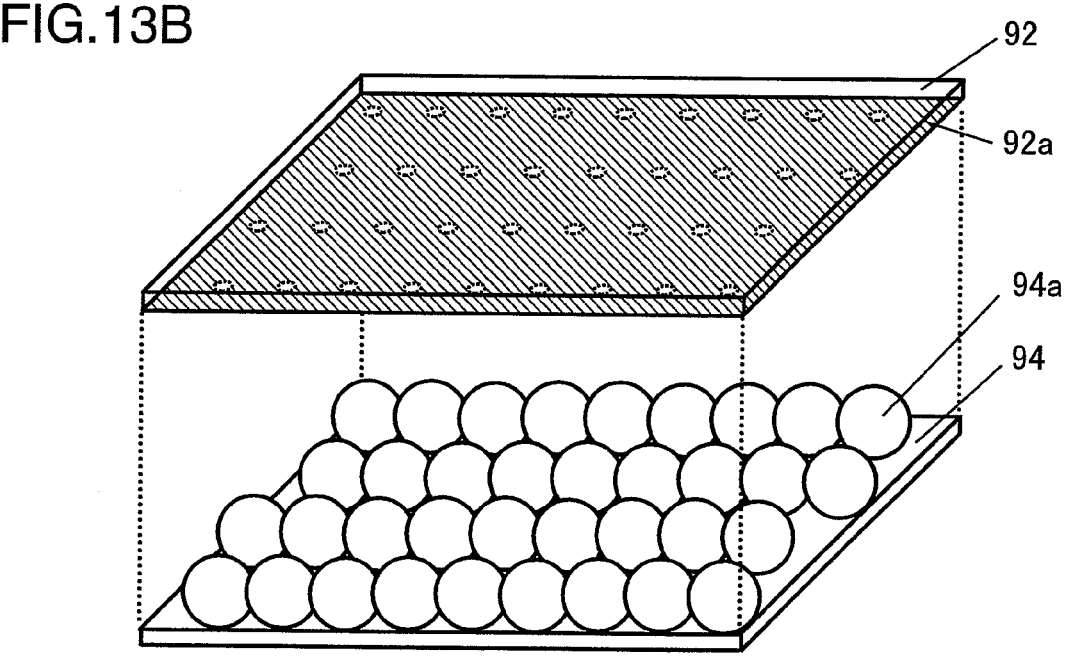

FIG. 13 are schematic construction diagrams showing another liquid crystal display device 100 according to the third embodiment, wherein FIG. 13A is a section of the liquid crystal display device and FIG. 13B is a perspective view of a structure sheet and a diffusion sheet.

The liquid crystal display device 100 of FIG. 13 differs from the liquid crystal display device 90 of FIG. 12 in that the structure sheet 91 shown in FIG. 12 is replaced by a structure sheet 94.

In FIGS. 13A and 13B, the structure sheet 94 is constructed such that a plurality of microscopic photoconductors 94a formed by ball lenses are arranged.

A diffusion sheet 92 includes black stripes 92a provided in areas other than those corresponding to the top surfaces of the micro photoconductors 94a of the structure sheet 94 and adapted to absorb outside light.

The ball lenses of the microscopic photoconductors 94a condense light near the emergent surface touching the diffusion sheet 92.

By this construction as well, light emitted from the liquid crystal panel 41 can be widely diffused and the reflection of outside light can be suppressed.

Although the microscopic photoconductors 91a, 94a are provided in correspondence with the respective subpixels 45R, 45G and 45B in the modes shown in FIGS. 12 and 13, a plurality of microscopic photoconductors may be provided for one subpixel. By doing so, a variation of a viewing angle distribution can be further reduced.

Further, in the case of sufficiently diffusing light by the microscopic photoconductors, for example, by containing diffusing beads in the microscopic photoconductors, it is also possible to arrange a non-diffusive transparent sheet instead of the diffusion sheet 92. By such a construction, outstanding while problem is further suppressed to improve a light contrast ratio.

Although the emergent rays 20R, 20G and 20B emerging from the respective subpixels of the pixels 45 are respectively incident on the corresponding micro photoconductors 91a in this embodiment, if emergent angles thereof vary upon the emission from the respective subpixels, parts of the emergent rays 20 are incident on the micro photoconductors 91a corresponding to the adjacent pixels to cause image blurring.

In this case, the image blurring can be reduced and a liquid crystal display device with high image quality can be realized by suppressing the variation of the emergent angles of the emergent rays 20 and thinning the emergent side glass substrate 44 and the emergent side polarizing plate 47.

Specifically, if a width P of the respective subpixels 45R, 45G and 45B and an angular variation φ of the emergent rays 20 in the glass substrate 44 are, for example, set to 200 μm and 10° and the divergence of the emergent rays 20 on the emergent surface of the emergent side polarizing plate 47 is permitted up to 3P (protruding width at one side is P), a thickness L from the pixels 45 to the emergent surface of the emergent side polarizing plate 47 is preferably equal to or below 1.1 mm. This relationship can be expressed by:

$$L < P/\tan \phi.$$

Although the emergent angle variation of the emergent rays 20 occurs when the emergent rays 20 are reflected by the deflecting grooves 16d of the light guide plate 16, an apparent variation of the emergent rays 20 in the glass substrate 44 can be reduced to reduce the image blurring by setting the refractive index of the glass substrate 44 higher than that of the light guide plate 16.

Fourth Embodiment

In a planar illumination device according to a fourth embodiment of the present invention, a specific construction of the reflective color filter used in the planar illumination device and the liquid crystal display device shown in the first to third embodiments is shown.

A reflective color filter according to this embodiment has microscopic periodic structures and is formed by diffraction gratings for selectively and strongly reflecting light of specific wavelengths by resonance.

Such a diffraction grating is also called a subwavelength grating and so constructed as not to generate high-order diffracted light by periodic structures formed by gratings with a pitch equal to or shorter than the wavelength of incident light.

If light of a specific wavelength in conformity with the grating shape is incident on the above periodic structure, resonance occurs inside due to multiple reflections and the light of the specific wavelength is selectively and strongly reflected.

Figure 14:
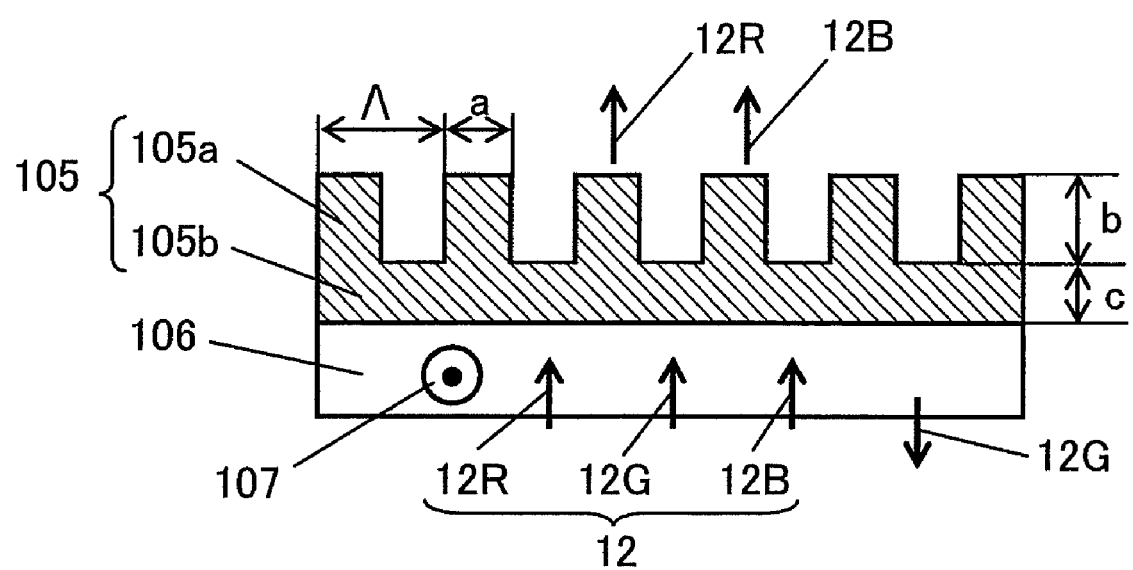

FIG. 14 is a diagram showing a specific design example of a subwavelength grating according to the fourth embodiment, specifically a section showing the structure of an optical layer 105, for example, having a function of reflecting G light.

The subwavelength grating shown in FIG. 14 includes a substrate 106 and an optical layer 105 provided on the substrate 106.

The optical layer 105 includes a waveguide layer 105b and a diffraction grating layer 105a projecting at periods Λ on this waveguide layer 105a.

For example, when the period Λ=365 μm, grating width a/period Λ=0.5, grating height b=200 μm, a thickness c of the waveguide layer 105b=100 nm, a refractive index n1 of the optical layer 105=1.73 and a refractive index n2 of a substrate 106=1.4, it can be confirmed by simulation using a RCWA method or the like that only G light 12G having a wavelength of 535 nm undergoes resonant reflection if laser light 12 is incident with TE polarization.

The reflectance of the resonant reflection by such a linear grating shape depends on a polarization direction and is higher in the case where light is incident with TE polarization. Further, since the wavelength width at which resonant reflection occurs is narrow, a higher reflectance is obtained when light of a single wavelength such as laser light is used.

The wavelength at which resonant reflection occurs can be changed by the material, shape or refractive index of the periodic structure. In this embodiment, the subwavelength gratings for allowing R light, G light and B light to respectively undergo resonant reflection are formed by changing the grating period Λ of the periodic structures.

Figure 15A:
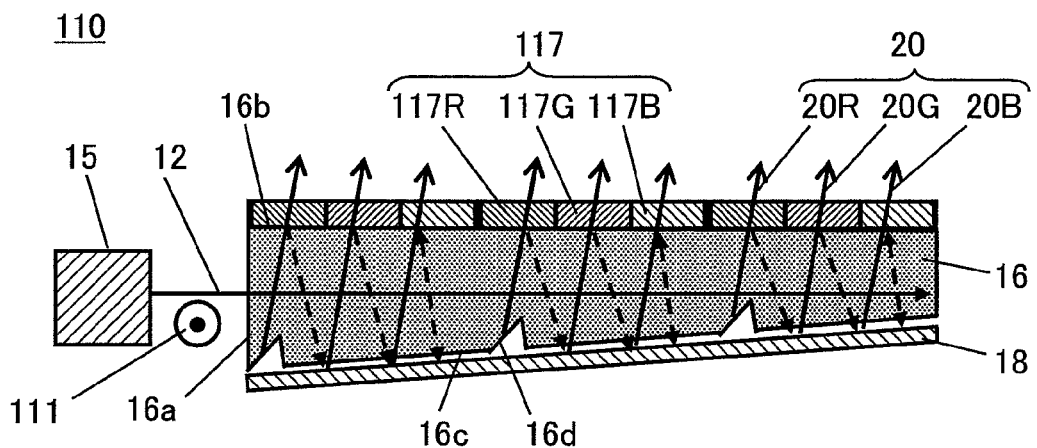

FIG. 15 are sections showing a schematic construction of a planar illumination device 110 according to the fourth embodiment of the present invention, wherein FIG. 15A is a section of the planar illumination device and FIG. 11B is a section diagrammatically showing the structure of a reflective color filter.

This embodiment differs from the first to third embodiments only in a reflective color filter 117. Since the other constituent elements are same, they are identified by the same reference numerals and not described.

Figure 15B:
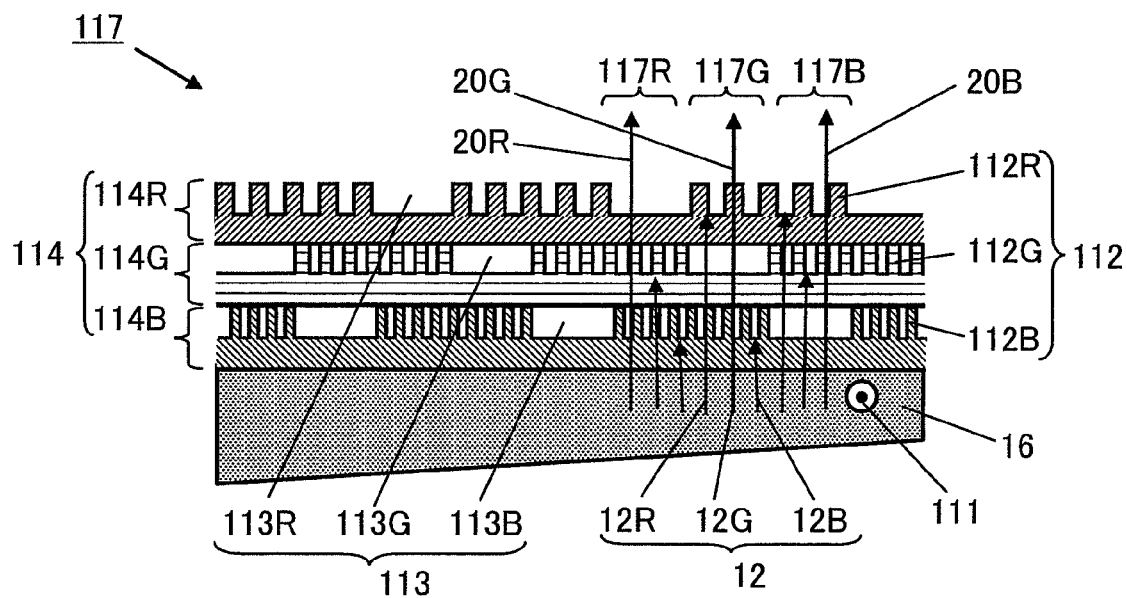

As shown in FIGS. 15A and 15B, the planar illumination device 110 according to the fourth embodiment includes the reflective color filter 117 formed by laminating subwavelength gratings on a principal surface 16b of a light guide plate 16.

The reflective color filter 117 is made up of three optical layers 114 (114R, 114G and 114B) laminated on the principal surface 16b of the light guide plate 16.

Each optical layer 114 includes areas where periodic structures 112 (112R, 112G and 112B) formed by microscopic grating shapes having submicron periods and areas of apertures 113 (113R, 113G and 113B) where no periodic structure 112 is formed.

Laser light 12 incident on the light guide plate 16 has a polarization direction 111 parallel to the principal surface 16b.

The periodic structures 112R, 112G and 112B are formed by grating shapes having different periods so as to allow light of different wavelengths to undergo resonant reflection.

Specifically, the periodic structure 112R allows R light 12R included in the laser light 12 to undergo resonant reflection. The periodic structure 112G allows G light 12G included in the laser light 12 to undergo resonant reflection. The periodic structure 112B allows B light 12B included in the laser light 12 to undergo resonant reflection.

The polarization direction 111 of the laser light 12 as incident light is polarization (TE polarization) in a direction along a longitudinal direction of recessed grooves of the periodic structures 112.

The apertures 113 permit light of all wavelengths to pass. Accordingly, a filter 117B for emitting only B light 20B can be formed by laminating the apertures 113 and the periodic structures 112R and 112G A filter 117G for emitting only G light 20G can be formed by laminating the apertures 113 and the periodic structures 112R and 112B. A filter 117R for emitting only R light 20R can be formed by laminating the apertures 113 and the periodic structures 112G and 112B.

The filters 117R, 117G and 117B of the reflective color filter 117 are arranged adjacent to each other.

In the planar illumination device 110 thus constructed, laser light 12 emitted from a light source (not shown) constructed similar to those of the first and second embodiments is incident on the light guide plate 16 while being polarized in the polarization direction 111.

The laser light 12 incident on the light guide plate 16 is reflected by deflecting grooves 16d formed in an opposed surface 16c and emerges from the principal surface 16b as light substantially perpendicular to the principal surface 16b to reach the reflective color filter 117.

While the laser light 12 having reached the reflective color filter 117 is repeatedly reflected between the reflective color filter 117 and a recycle sheet 18, light of corresponding wavelengths emerges as emergent rays 20 from the respective filters 117R, 117G and 117B of the reflective color filter 117.

Next, the operation of the reflective color filter 117 is described in detail. As shown in FIG. 15B, the laser light 12 emerging from the light guide plate 16 is first incident on the optical layer 114B of the reflective color filter 117.

The optical layer 114B is formed with the periodic structures 112B, for example, having a grating shape with a period of 300 nm and the apertures 113B so that only B light 12B, for example, having a wavelength of 445 nm undergoes resonant reflection. Accordingly, the periodic structures 112B reflect the B light 12B while transmitting R light 12R and G light 12G, and the entire light incident on the apertures 113B passes therethrough.

Similarly, the optical layer 114G is formed with the periodic structures 112G, for example, having a grating shape with a period of 365 nm and the apertures 113B so that only G light 12G, for example, having a wavelength of 535 nm undergoes resonant reflection. Accordingly, the periodic structures 112G reflect the G light 12G while transmitting R light 12R and B light 12B, and the entire light incident on the apertures 113B passes therethrough.

Further, the next optical layer 114R is formed with the periodic structures 112R, for example, having a grating shape with a period of 445 nm and the apertures 113R so that only R light 12R, for example, having a wavelength of 640 nm undergoes resonant reflection. Accordingly, the periodic structures 112R reflect the R light 12R while transmitting G light 12G and B light 12B, and the entire light incident on the apertures 113R passes therethrough.

In other words, if the laser light 12 is incident on the filter 117B, all the laser lights 12R, 12G and 12B pass through the apertures 113B and the laser lights 12R and 12G are reflected by the optical layers 114G and 114R, so that only the G light 12G is emitted.

Further, if the laser light 12 is incident on the filter 117G, the B light 12B is reflected by the optical layer 114B and the R light 12R and the G light 12G pass through the apertures 113G and the R light 12R is reflected by the optical layer 114R, so that only the G light 12G is emitted.

Furthermore, if the laser light 12 is incident on the filter 117R, the B light 12B is reflected by the optical layer 114B and the G light 12G is reflected by the optical layer 114Q so that only the R light 12R is emitted.

Accordingly, by employing such a construction, the laser light 12 is separated into the R light 12R, G light 12G and B light 12B and can efficiently emerge from the respective specified regions 117R, 117G and 117B. In this way, a planar illumination device capable of efficient wavelength separation can be realized.

In the case of using the planar illumination device 110 as a backlight of a liquid crystal display device, a loss in a polarizing plate can be reduced and an extremely low power consuming liquid crystal display device can be realized by conforming a transmission axis of an incident side polarizing plate of a liquid crystal panel to the longitudinal direction of the gratings of the periodic structures 112.

Here, if the widths of the apertures 113R, 113G and 113B are set equal or at a specific ratio corresponding to the light quantity of the light source, light passing through the reflective color filter 117 is mixed to become white light. By locally changing the ratio of the widths of the apertures 113R, 113G and 113B, a desired color can be produced by mixing the light emerging from the reflective color filter 117.

If the regions for reflecting the R light 12R, G light 12G and B light 12B are added, a planar illumination device capable of displaying arbitrary luminance distribution and color distribution can be realized. This can be applied to thin sign boards and the like for displaying vivid colors.

Further, it is also possible to produce uniform illumination by correcting luminance nonuniformity and color nonuniformity inherent to the planar illumination device, the planar illumination device is also useful as a backlight for liquid crystal display.

Although full color is displayed by arranging the apertures 113R, 113G and 113B in such a manner as not to overlap and causing the emergent rays 20R, 20G and 20B to emerge from the independent filters 117R, 117G and 117B in the example shown in FIG. 15, the apertures 113R, 113G and 113B may overlap to mix colors in the same regions.

A laminated structure like that of the reflective color filter 117 can be fabricated with good efficiency and good mass productivity and at low cost by a method using nano-imprinting disclosed, for example, in Japanese Unexamined Patent Publication No. 2007-69443.

Figure 16A:
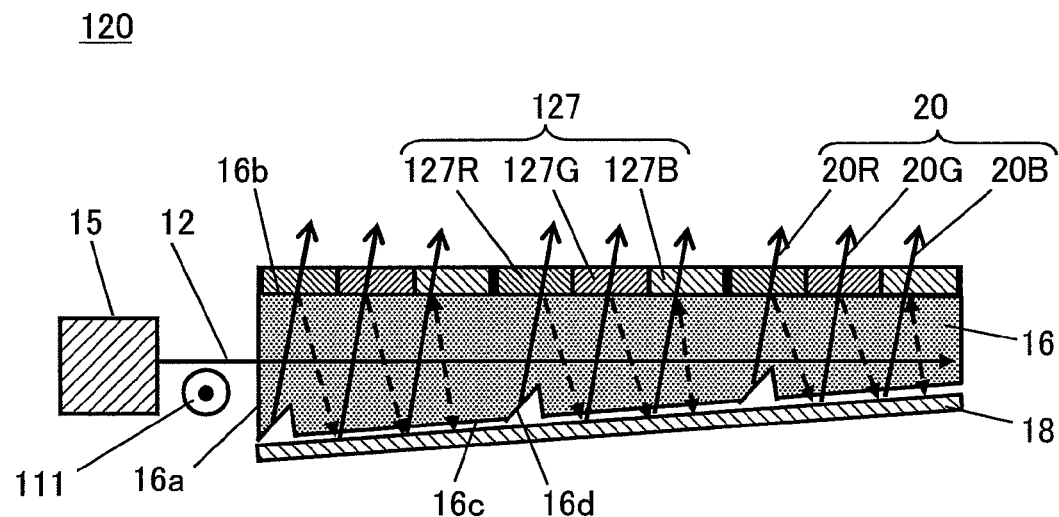
Figure 16B:
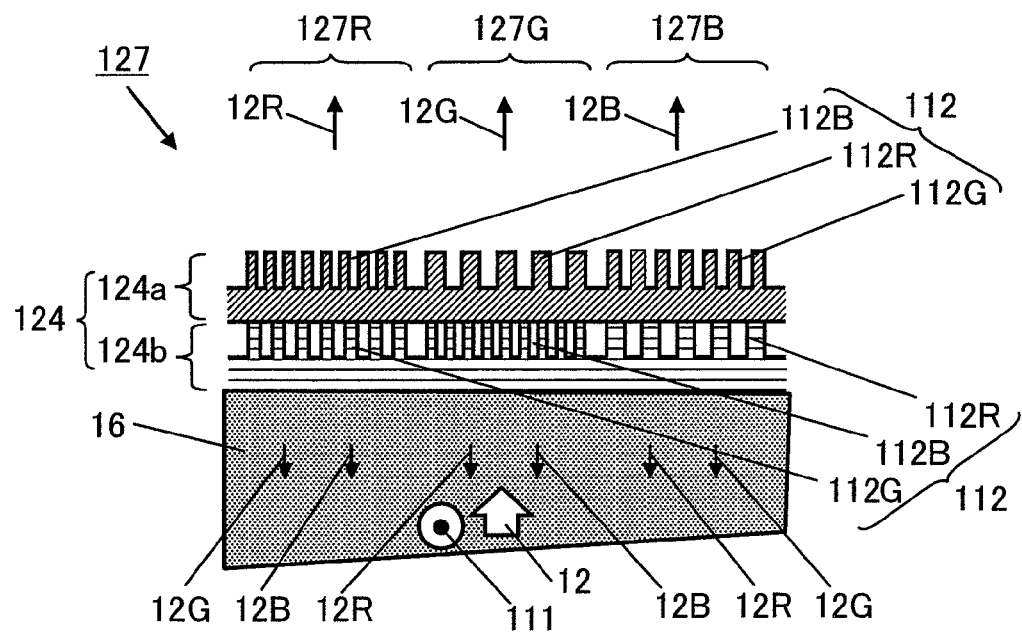

FIG. 16 are sections showing a schematic construction of another planar illumination device 120 according to the fourth embodiment of the present invention, wherein FIG. 16A is a section of the planar illumination device and FIG. 16B is a section diagrammatically showing the structure of a reflective color filter.

This mode differs from the construction shown in FIG. 15 only in a reflective color filter 127. Since the other constituent elements are same, they are identified by the same reference numerals and not described.

As shown in FIGS. 16A and 16B, the reflective color filter 127 includes an optical layer 124, which is made up of two optical layers 124a and 124b laminated on each other.

Each of the optical layers 124a and 124b has periodic structures 112 formed by microscopic grating shapes having submicron periods. Each of the optical layers 124a and 124b is formed with at least three types of periodic structures 112R, 112G and 112B having different periods.

The respective optical layers 124a and 124b are laminated on each other such that the different periodic structures 112R, 112G and 112B overlap, and areas where the two types of periodic structures overlap form filters 127R, 127G and 127B.

Specifically, the periodic structure 112B are formed in areas on the optical layer 124a corresponding to the filters 127R and the periodic structures 112G are formed in areas on the optical layers 124b corresponding to the filters 127R.

The periodic structures 112R are formed in areas on the optical layer 124a corresponding to the filters 127G and the periodic structures 112B are formed in areas on the optical layers 124b corresponding to the filters 127G.

The periodic structures 112G are formed in areas on the optical layer 124a corresponding to the filters 127B and the periodic structures 112R are formed in areas on the optical layers 124b corresponding to the filters 127B.

Further, the periodic structures 112 (112R, 112G and 112B) are respectively formed to resonantly reflect light of specific wavelengths.

The filters 127R reflect G light 12G and B light 12B while transmitting only the remaining R light 12R.

The filters 127G reflect R light 12R and B light 12B while transmitting only the remaining G light 12G

The filters 127B reflect R light 12R and G light 12G while transmitting only the remaining B light 12B.

In other words, the reflective color filter 127 having the same optical function as the construction shown in FIG. 15 can be realized by the construction having one less layer than the construction shown in FIG. 15. Thus, the number of operation steps can be reduced to promote a cost reduction.

In this construction, a specific color can be displayed by changing the ratio of the widths of the filters 127R, 127G and 127B. Unlike the construction shown in FIG. 15, black color cannot be displayed since there is no area capable of reflecting all of the R light, G light and B light.

Although the reflective color filter 127 shown in FIG. 16B has such a structure of laminating the periodic structures 112 having submicron periods, a reflective color filter having a similar function can be realized even if two optical layers are laminated such that periodic structures face each other or periodic structures are formed on the opposite sides of the same substrate.

Figure 17A:
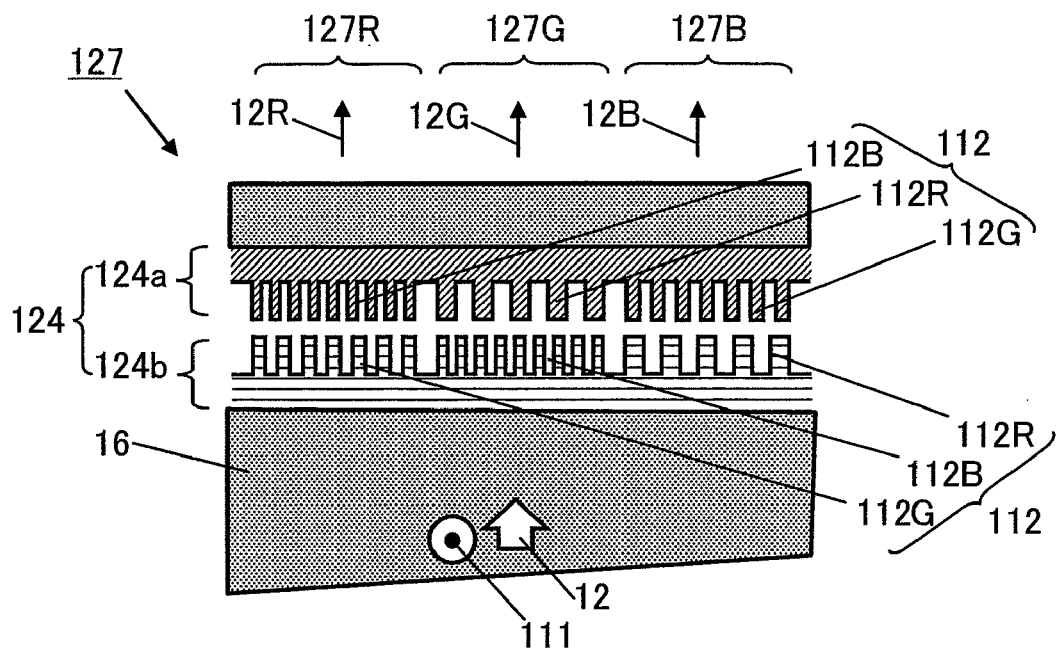
Figure 17B:
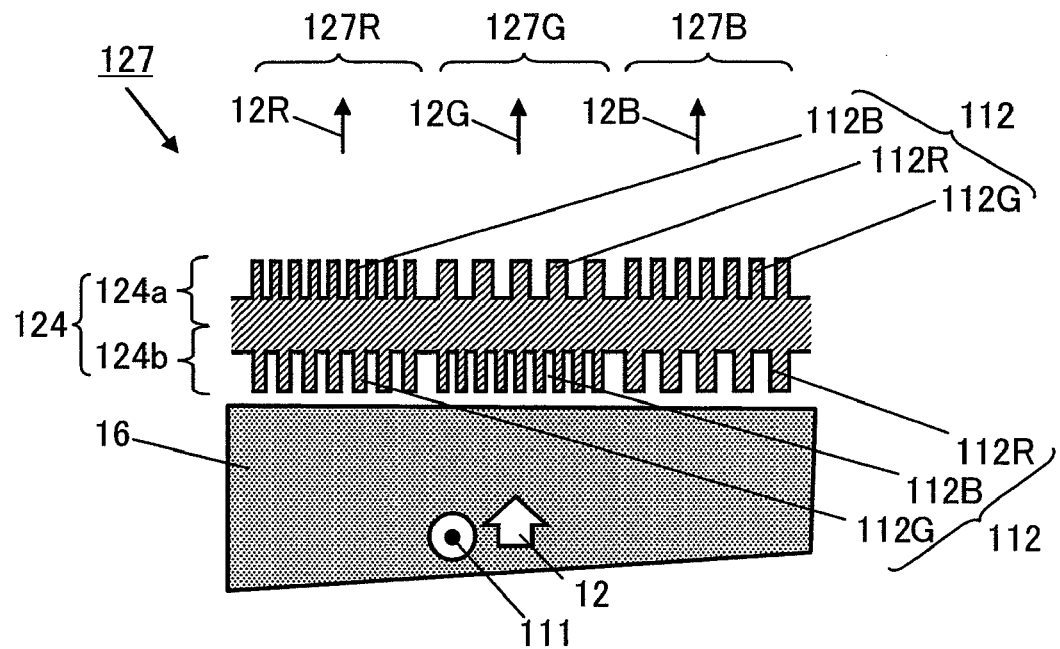

FIG. 17 are sections diagrammatically showing other constructions of the reflective color filter 127 shown in FIG. 16, wherein FIG. 17A is a section showing a structure in which periodic structures face each other and FIG. 17B is a section showing a structure in which periodic structures are arranged on the opposite sides of a substrate.

If a construction as shown in FIG. 17A is employed, the respective optical layers 124a and 124b need to be positioned such that different types of periodic structures face each other. However, since the respective periodic structures can be produced by single layers, it becomes easier to increase an area by using a rolling method.

If a construction as shown in FIG. 17B is employed, the periodic structures can be simultaneously formed on the opposite surfaces of the substrate using a rolling method, whereby the number of operation steps can be reduced and a larger area can be dealt with.

Although light with aligned polarization is incident on the light guide plate 16 in the modes shown in FIGS. 15 to 17, incident light on the reflective color filter may be TE polarized light by causing randomly polarized light to be incident on the light guide plate 16 and arranging a polarization reflection sheet between the light guide plate 16 and the reflective color filter. By such a construction, LEDs can be used as light sources to improve a degree of freedom in designing.

Although the periodic structures of the respective optical layers of the reflective color filters shown in FIGS. 15 to 17 are grating structures in which portions with different refractive indices are arranged in an arrangement direction of the respective R, G and B filter regions, the gratings may be periodically arranged in a direction orthogonal to the arrangement direction of the respective filter regions or the gratings may be two-dimensionally arranged when viewed from above.

Figure 18A:
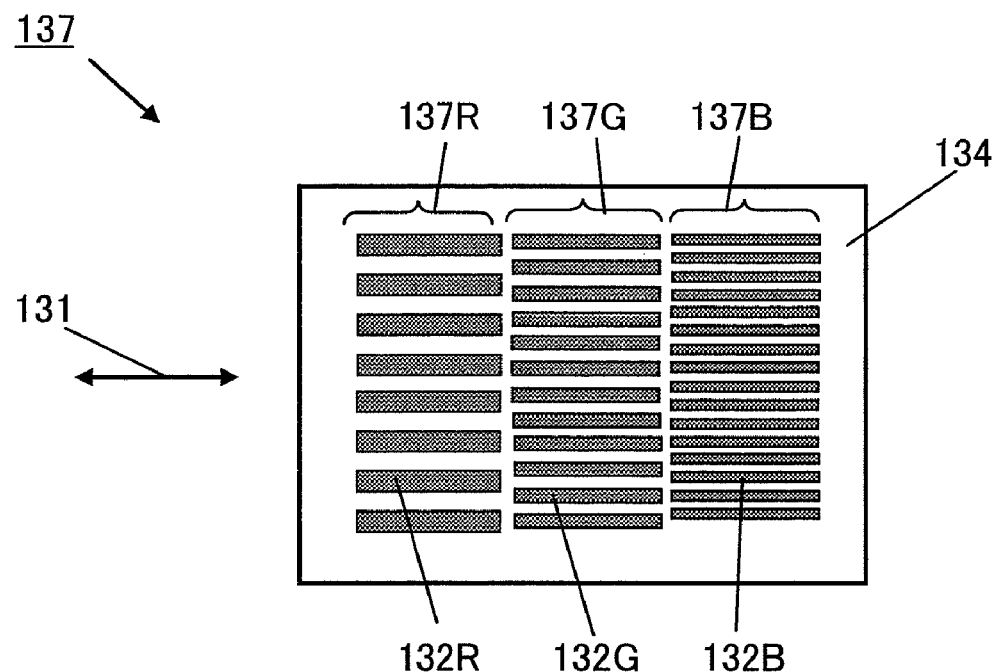
Figure 18B:
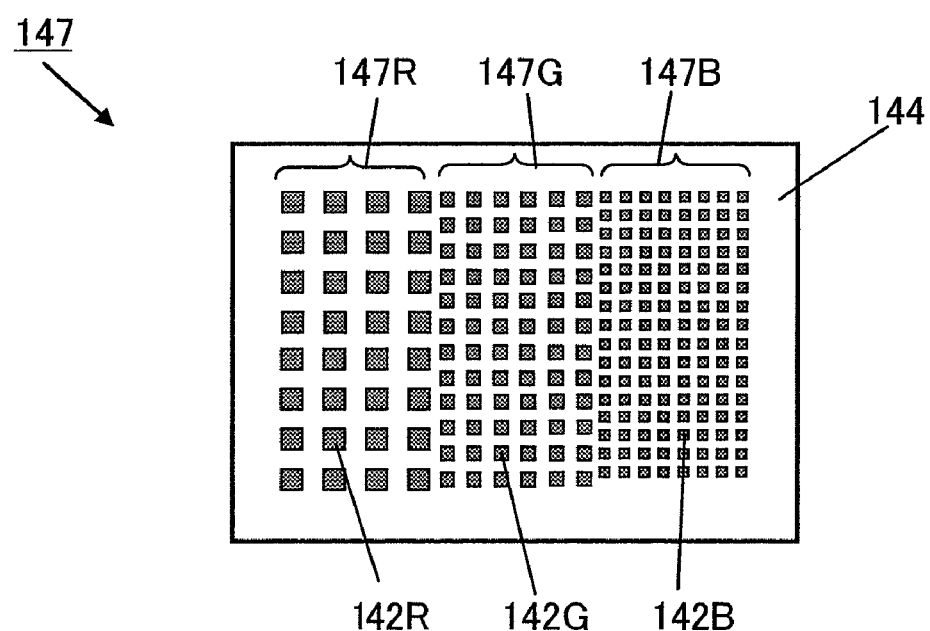

FIG. 18 are schematic diagrams showing construction examples of the reflective color filter according to the fourth embodiment, wherein FIG. 18A is a plan view showing other linear gratings and FIG. 18B is a plan view showing two-dimensional gratings.

Periodic structures 132R, 132G and 132B in which gratings are arranged at peculiar periods in a direction orthogonal to an arrangement direction of filters 137R, 137G and 137B are formed on an optical layer 134 of a reflective color filter 137 shown in FIG. 18A.

Light incident on this reflective color filter 137 has polarization directions 131 (extending direction of the respective filters 137R, 137G and 132B).

In the case where subwavelength gratings are formed by linear gratings as shown in FIG. 18A, the range of an incident angle at which resonant reflection occurs according to an incident direction of light largely differs.

Generally, the range of the incident angle at which resonant reflection occurs is wide for light incident in a direction (transverse direction in FIG. 18) along the grating shapes, whereas the range of the effective incident angle is narrow for light incident in a direction orthogonal to the above one.

Since the narrower incident angle range is about several degrees although it depends on the construction, the direction of the gratings needs to be properly set in conformity with the construction of the light guide plate. Specifically, in the planar illumination device 110 shown in FIG. 15A, an emergent angle variation of the laser light 12 emerging from the light guide plate 16 is large in the shown transverse direction due to the diffraction of the deflecting grooves 16d or the like, but can be suppressed in an orthogonal direction.

In such a construction, the variation range of the incident angle at which resonant reflection can occur can be widened by forming the gratings extending in the direction in which the variation of the incident light is large as in FIG. 18A. Thus, light utilization efficiency can be improved.

Periodic structures 142R, 142G and 142B formed by two-dimensional grating structures are formed in filters 147R, 147G and 147B on an optical layer 144 of a reflective color filter 147 shown in FIG. 18B.

By such a construction, the dependency of resonant reflection in the respective filters 147R, 147G and 147B on the polarization direction and incident direction of incident light can be reduced, wherefore a degree of freedom in the arrangement position of the reflective color filter is improved.

For example, if a polarization dependent filter formed by linear subwavelength gratings is used as an absorptive color filter in a liquid crystal panel, light utilization efficiency is reduced since light having the polarization thereof modulated by a liquid crystal layer is incident on the absorptive color filter. However, if the absorptive color filter has the structure with small dependency on the polarization direction shown in FIG. 18B, it can be arranged in such a place.

Although the diffraction grating layer 105a (see FIG. 14) is the reflective color filter including the periodic structures formed by intermittently arranged grating shapes in the fourth embodiment, the periodic structures are not limited to the grating shapes as long as they are constructed such that portions with different refractive indices are periodically arranged. In other words, effects similar to those of the fourth embodiment can be obtained even if the periodic structures are formed by refractive index distributions.

Although the grating shapes arranged on the rectangular diffraction grating layer 105a are described in the fourth embodiment, the shape of the diffraction grating layer is not limited to the rectangular shape. For example, a diffraction grating layer having a triangular, trapezoidal or other shape can also be employed.

Fifth Embodiment

In a planar illumination device according to a fifth embodiment of the present invention, specific constructions of the reflective color filters used in the planar illumination devices and the liquid crystal display devices shown in the first to third embodiments are shown.

A reflective color filter of this embodiment has a periodic structure in which two types of thin films having different refractive indices are alternately laminated at periods that are about ¼ of the wavelength of light to be reflected. By this periodic structure, the reflective color filter is formed with a photonic gap where the presence of the light to be reflected is not permitted.

Further, the reflective color filter transmits only light of specific wavelengths in a reflection range by having defective layers for disturbing the period of the periodic structure provided in parts thereof.

In other words, the reflective color filter according to this embodiment is a laminated interference filter using so-called photonic crystal technology.

Figure 19A:
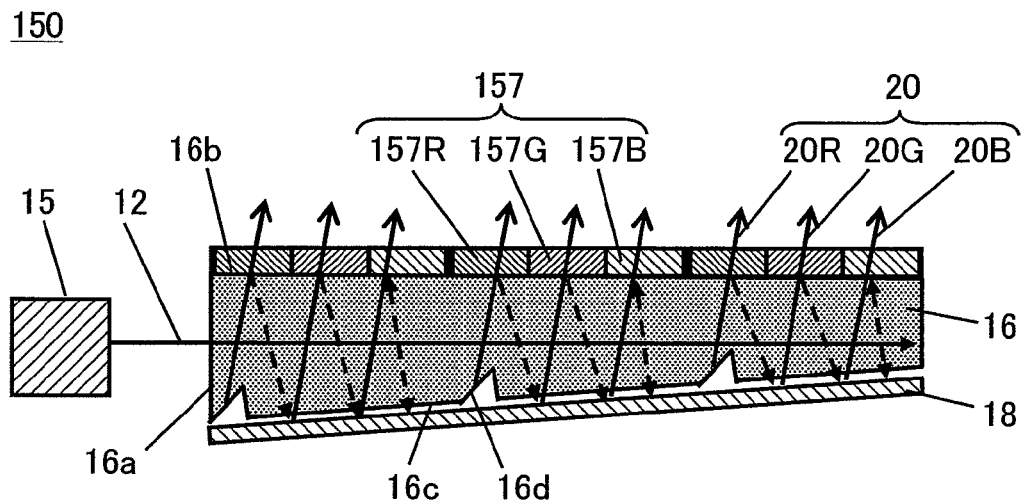
Figure 19B:
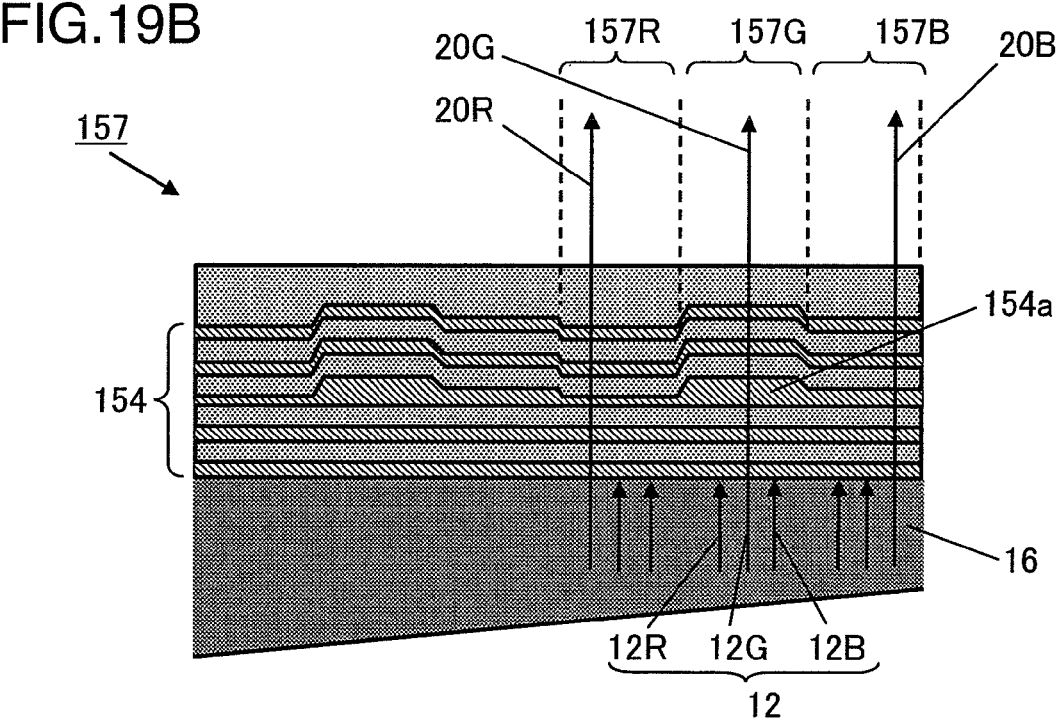

FIG. 19 are sections showing a schematic construction of a planar illumination device 150 according to the fifth embodiment of the present invention, wherein FIG. 19A is a section of the planar illumination device and FIG. 19B is a section diagrammatically showing the structure of a reflective color filter.

This embodiment differs from the first to fourth embodiments only in the reflective color filter 157 and the other constituent elements are identified by the same reference numerals and not described since being the same.

As shown in FIGS. 19A and 19B, the planar illumination device 150 according to the fifth embodiment is provided with the reflective color filter 157 including a multilayer film 154 formed on a principal surface 16b of a light guide plate 16.

The multilayer film 154 is formed by periodically laminating two types of thin films having different refractive indices. Further, the multilayer film 154 includes a defective layer 154a having different thicknesses for respective filters 157R, 157G and 157B, so that the respective filters 157R, 157G and 157B transmit only lights of specific wavelengths corresponding to the thicknesses of the defective layers 154a.

Here, several suitable structures in accordance with required optical specifications can be thought as the film structure of the multilayer film 154. Accordingly, examples of the film structure having a high transmittance for a specific wavelength and capable of realizing a high reflectance for other wavelengths is shown in FIG. 20.

Figure 20A:
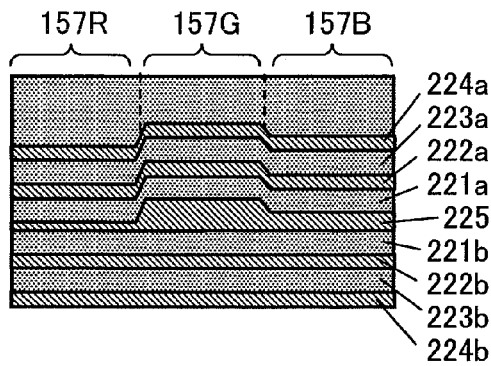
FIGS. 20A, 20C and 20E are schematic construction diagrams of reflective color filters
Figure 20B:
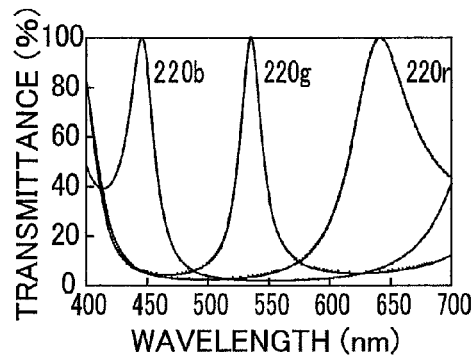
Figure 20C:
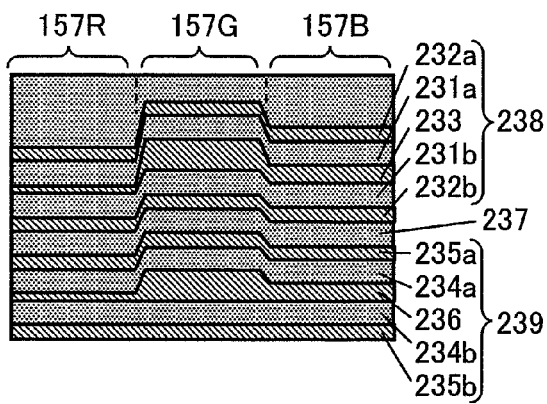
Figure 20D:
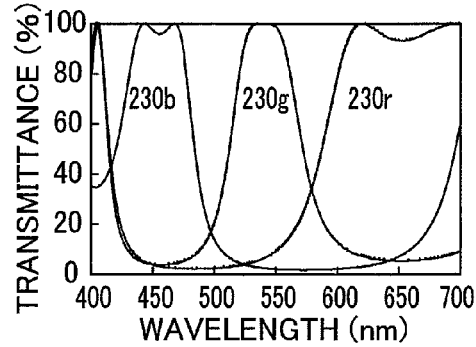
Figure 20E:
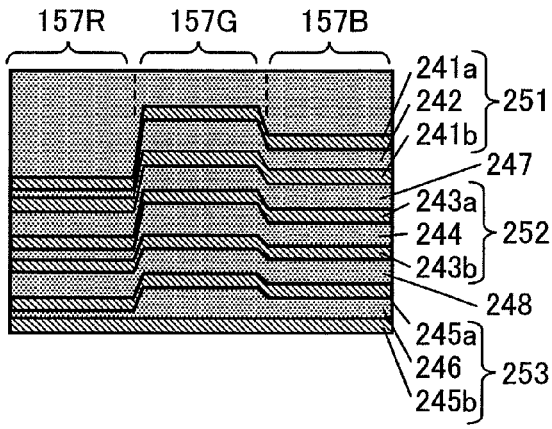
Figure 20F:
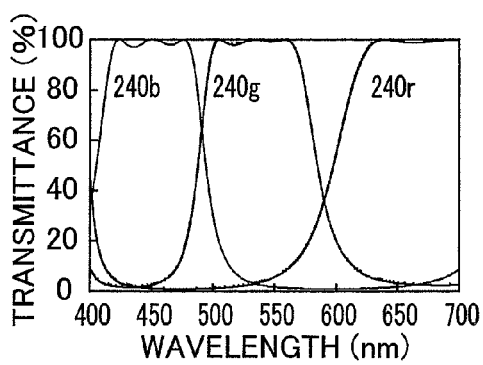

FIG. 20 are diagrams showing three structure examples of the reflective color filter 157 according to the fifth embodiment and characteristics thereof, wherein FIGS. 20A, 20C and 20E are schematic construction diagrams of the reflective color filters and FIGS. 20B, 20D and 20F show spectral characteristics of the respective structures of FIGS. 20A, 20C and 20E.

In the spectral characteristics of FIGS. 20B, 20D and 20F, a vertical axis represents transmittance and a horizontal axis represents wavelength of transmission light. The reflective color filter according to this embodiment is formed to reduce absorption in a wavelength range of visible light while substantially reflecting light not to be transmitted. Accordingly, for example, a transmittance of 5% means a reflectance of 95%.

In the structure of FIG. 20A, the reflective color filter 157 is formed by laminating low refractive index layers 221a, 221b, 223a and 223b made of a low refractive index material (e.g. silicon dioxide ($SiO_2$)), high refractive index layers 222a, 222b, 224a and 224b made of a high refractive index material (e.g. titanium dioxide ($TiO_2$)) and a defective layer 225 made of a high refractive index material.

The film structures in regions of the respective filters 157R, 157G and 157B are respectively formed to be symmetrical with the defective layer 225 as a center.

The thicknesses of the respective layers 221a, 221b, 222a, 222b, 223a, 223b, 224a and 224b excluding the deflective layer 225 are set such that optical film thicknesses obtained by multiplying physical film thicknesses by the refractive indices are substantially equal to ¼ of a set wavelength (e.g. 535 nm), and are same in the regions of the respective filters 157R, 157G and 157B.

On the other hand, the defective layer 225 has different thicknesses in the regions of the respective filters 157R, 157G and 157B to transmit lights of specific wavelengths.

In the structure of FIG. 20C, the reflective color filter 157 includes a five-layer film 238, a five-layer film 239 and a connecting layer 237 provided between these five-layer films 238 and 239 to connect the respective five-layer films 238 and 239.

The five-layer film 238 is formed by laminating low refractive index layers 231a, 231b made of a low refractive index material, high refractive index layers 232a, 232b made of a high refractive index material and a defective layer 233 made of a high refractive index material.

The five-layer film 239 has a construction similar to that of the five-layer film 238. Specifically, the five-layer film 239 is formed by laminating low refractive index layers 234a, 234b made of a low refractive index material, high refractive index layers 235a, 235b made of a high refractive index material and a defective layer 236 made of a high refractive index material.

In this structure as well, the respective layers 231a, 231b, 232a, 232b, 234a, 234b, 235a and 235b of the five-layer films 238, 239 excluding the defective layers 233, 236 have the same thicknesses in the regions of the respective filters 157R, 157G and 157B and optical film thicknesses obtained by multiplying physical film thicknesses by the refractive indices are equal to ¼ of a set wavelength.

The film structures of the respective five-layer films 238, 239 are respectively symmetrical with the defective layers 233, 236 as centers.

In the structure of FIG. 20E, the reflective color filter 157 includes three-layer films 251, 252 and 253, a connecting layer 247 provided between the three-layer films 251 and 252 for connecting the three-layer films 251, 252, and a connecting layer 248 provided between the three-layer films 252 and 253 for connecting the three-layer films 252, 253.

The three-layer film 251 is formed by laminating high refractive index layers 241a, 241b made of a high refractive index material and a defective layer 242 made of a low refractive index material.

The three-layer film 252 is formed by laminating high refractive index layers 243a, 243b made of a high refractive index material and a defective layer 244 made of a low refractive index material.

The three-layer film 253 is formed by laminating high refractive index layers 245a, 245b made of a high refractive index material and a defective layer 246 made of a low refractive index material.

In this structure as well, the respective layers 241a, 241b, 243a, 243b, 245a and 245b of the three-layer films 251, 252 and 253 excluding the defective layers 242, 244 and 246 have the same thicknesses in the regions of the respective filters 157R, 157G and 157B and optical film thicknesses obtained by multiplying physical film thicknesses by the refractive indices are equal to ¼ of a set wavelength.

Further, the film structures of the respective three-layer films 251, 252 and 253 are respectively symmetrical with the defective layers 242, 244 and 246 as centers.

Although the optical thicknesses of the defective layers 242 and 246 are equal in this embodiment, the thickness of the defective layer 244 may not necessarily coincide with that of the defective layers 242 and 246.

In other words, the coincidence of the thicknesses of the defective layers 242, 244 and 246 is theoretically a condition to maximize the transmittance of light of specific wavelengths, but transmittance tends to be slightly decreased for some wavelengths in a reflection wavelength range if the thicknesses of the defective layers 242, 244 and 246 actually coincide. Since it has been confirmed to suppress a reduction in the transmittance by slightly changing the thickness of the defective layer 244 with respect to those of the defective layers 242, 246, the above setting is preferable.

A feature of the reflective color filters 157 shown in FIGS. 20A, 20C and 20E is that the film structure is formed by laminating the high refractive index layers or low refractive index layers on the opposite sides of the defective layer having different thicknesses in the regions of the respective filters 157R, 157G and 157B and is symmetrical with the defective layer as a center.

Another feature of the reflective color filter 157 is to set the optical thicknesses of the high refractive index layers and the low refractive index layers substantially equal to ¼ of the set wavelength.

Still another feature of the reflective color filter 157 is to connect a plurality of multilayer films with similar structures via connecting layer(s).

In the structures shown in FIGS. 20C and 20E, the optical thicknesses of the connecting layers 237, 247 and 248 are also preferably ¼ of the wavelength.

Although silicon dioxide is cited as an example of the low refractive index material and titanium dioxide is cited as an example of the high refractive index material, such materials are not limited to these and any other materials having a large refractive index difference may also be used.

The refractive index difference influences the reflection bandwidth of the reflective color filter 157. In order to allow the respective filters to reflect lights other than those of the specific wavelengths, a difference between a maximum value and a minimum value of the refractive index of each layer forming each filter needs to be substantially equal to or larger than 0.6.

FIGS. 20B, 20D and 20F show the spectral characteristics of the structures shown in FIGS. 20A, 20C and 20E.

In FIGS. 20B, 20D and 20F, spectral characteristics 220r, 230r and 240r indicate the spectral characteristics of R light filters 157R, spectral characteristics 220g, 230g and 240g indicate the spectral characteristics of G light filters 157G, and spectral characteristics 220b, 230b and 240b indicate the spectral characteristics of B light filters 157B.

The following can be understood for the respective structures of FIGS. 20A, 20C and 20E as shown in FIGS. 20B, 20D and 20F.

The R light filters 157R (spectral characteristics 220r, 230r, 240r) have a characteristic of transmitting R light (wavelength of 640 nm) while reflecting G light (wavelength of 535 nm) and B light (wavelength of 445 nm).

The G light filters 157G (spectral characteristics 220g, 230g, 240g) have a characteristic of transmitting G light (wavelength of 535 nm) while reflecting R light (wavelength of 640 nm) and B light (wavelength of 445 nm).

The B light filters 157B (spectral characteristics 220b, 230b, 240b) have a characteristic of transmitting B light (wavelength of 445 nm) while reflecting R light (wavelength of 640 nm) and G light (wavelength of 535 nm).

Next, the operation of the thus constructed planar illumination device 150 according to the fifth embodiment is specifically described. The reflective color filter 157 has the structure shown in FIG. 20A, 20C or 20E.

In the planar illumination device 150 shown in FIGS. 19 and 20, laser light 12 emitted from a light source (not shown) constructed similar to those of the first and second embodiments is substantially parallelly incident on the light guide plate 16.

The laser light 12 incident on the light guide plate 16 is reflected by deflecting grooves 16d formed in an opposed surface 16c of the light guide plate 16 to be deflected in a direction substantially perpendicular to the principal surface 16b and emerges from the principal surface 16b to reach the reflective color filter 157.

The laser light 12 having reached the reflective color filter 157 emerges as emergent rays 20 separated according to wavelength by the respective filters 157R, 157G and 157B of the reflective color filter 157 while being repeatedly reflected between the reflective color filter 157 and a recycle sheet 18.

According to the above planar illumination device 150, the laser light 12 incident on the light guide plate 16 can be emitted while being separated according to wavelength by the respective filters 157R, 157G and 157B of the reflective color filter 157 and, further, the light reflected by the reflective color filter 157 can also be uniformly emitted by being recycled without any waste.

Thus, a low power consuming and thin planar illumination device capable of wavelength separation can be realized. By combining such a planar illumination device with a liquid crystal panel, a very low power consuming and thin liquid crystal display device can be realized.

Here, in the reflective color filter 157 constructed as in FIG. 20, the wavelength range of transmission light tends to be displaced due to errors in the optical film thicknesses of the respective layers, the incident angle of the laser light 12 and the like.

Accordingly, as shown in FIG. 20B, the structure of FIG. 20A having narrow wavelength widths of lights to be transmitted for the respective R light, G light and B light is preferably used in the case errors in the optical film thicknesses of the respective layers and an error of the incident angle of the laser light 12 are small and a wavelength error of the light source is also small.

On the other hand, the structure of FIG. 20C or 20E is suitable in the case where an error in the wavelength of the light source or optical film thicknesses is large or the incident angle varies. Since these structures have a wide width of the transmission wavelength band, influence on efficiency is small even if the transmission wavelength is displaced.

Normally, if the number of the layers other than the defective layer is increased in the structure of FIG. 20A, the wavelength width of the transmission wavelength becomes narrower. On the other hand, if the number of the layers other than the defective layer is decreased, the wavelength width of the transmission wavelength is widened, but transmittance at wavelengths other than the transmission wavelength increases, thereby reducing the efficiency of light to be recycled.

The structures of FIGS. 20C and 20E realize structures strong against errors by widening the wavelength width of the transmission wavelength while realizing both high transmittance at specific wavelengths and high reflectance at the other wavelengths by connecting two or three multilayer films symmetrically structured with the defective layer arranged in the center by the connecting layer(s).

Here, the structures of FIGS. 20C and 20E are preferably symmetrical as a whole.

In other words, in the structure of FIG. 20C in which two multilayer films are connected, the defective layers 233 and 236 included in the two five-layer films 238 and 239 are preferably formed to have the same optical thickness.

In the structure of FIG. 20E in which three multilayer films are connected, the defective layers 242 and 246 of the multilayer films 251 and 253 at the opposite sides have the same optical thickness and the thickness of the defective layer 244 of the middle multilayer film 252 may not be equal to those of the defective layers 242 and 246.

By having such a symmetrical construction as a whole, transmittance at specific wavelengths can be set to be high even if a plurality of multilayer films are connected.

Figure 21A:
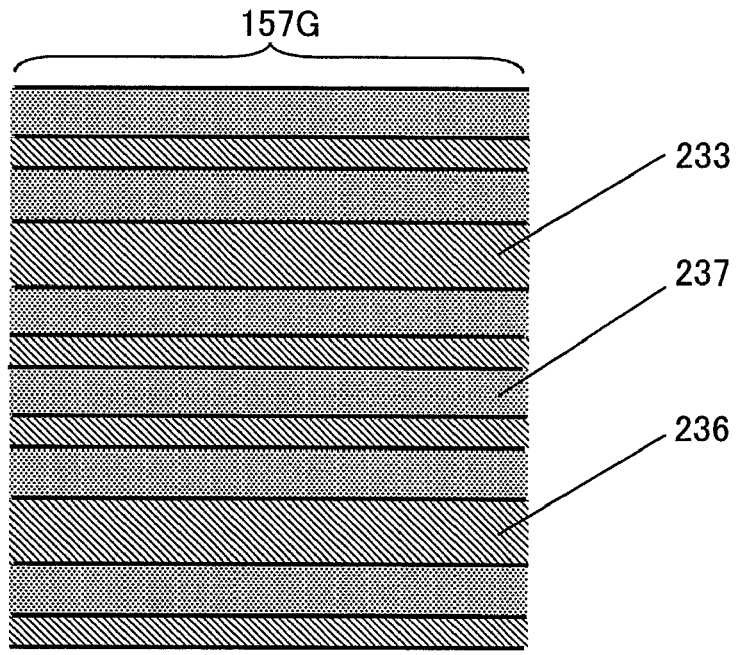
FIG. 21A is a section showing a film structure of a G light filter and FIG. 21B shows a spectral characteristic of the G light filter.
Figure 21B:
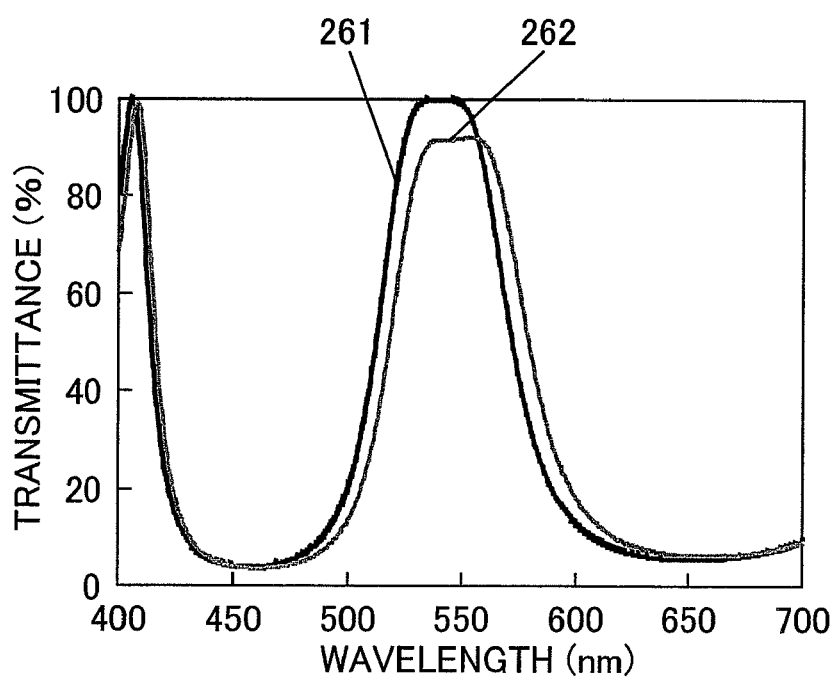

FIG. 21 are diagrams showing the influence of symmetry of the film structure shown in FIG. 20C, wherein FIG. 21A is a section showing the film structure of the G light filter and FIG. 21B shows a spectral characteristic of the G light filter.

In FIGS. 21A and 21B, a spectral characteristic 261 indicates a characteristic when the film structure of the G light filter 157G is symmetrical with the connecting layer 237 as a center, i.e. when the optical thicknesses of the defective layers 233 and 236 are equal.

Further, a spectral characteristic 262 indicates a characteristic when the optical thicknesses of the defective layers 233 and 236 differ by 5%.

As can be understood from FIG. 21B, higher transmittance can be obtained at specified wavelengths when the optical thicknesses of the two defective layers 233 and 236 coincide.

It should be noted that the defective layers may be made of a high refractive index material or a low refractive index material. However, if the deflective layers are made of the high refractive index material, a wavelength displacement of the spectral characteristic in response to the incident angle can be reduced, wherefore the defective layers are preferably made of the high refractive index material if a variation of the incident angle of the laser light 12 on the reflective color filter 157 is large.

Many operation steps such as two etching steps to form three different thicknesses are necessary to form the deflective layer. Thus, if many multilayer films including deflective layers are connected, a considerably large number of operation steps are necessary. In such a case, the number of etching steps can be reduced by forming films by sputtering or the like by masking the respective regions of the filters 157R, 157G and 157B.

The reflective color filter of the present invention described in the fourth and fifth embodiment utilizes reflection by a periodic refractive index distribution and transmission at the specific wavelengths by forming the defects in the periodic structure.

There are many photonic crystals formed to obtain a desired spectral characteristic by such a refractive index distribution other than those shown in the embodiments of the present invention, and effects similar to those of the present invention can be obtained even if reflective color filters using such photonic crystals are used.

All the constructions shown in the first to fifth embodiments of the present invention may be combined in any manner and the respective combinations exhibit effects peculiar to the present invention. Further, it goes without saying that various changes can be made without departing from the gist of the present invention and that similar effects are obtained.

As described above, the present invention proposes a novel construction for guiding RGB light to pixels of a liquid crystal panel and a thin liquid crystal display device with higher light utilization efficiency and lower power consumption as compared with conventional constructions.

Specifically, a wavelength separator according to the present invention emits light emerging from a light guide plate while selecting a wavelength for each filter region using a reflective color filter utilizing a photonic crystal structure, and recycles light reflected by the reflective color filter, thereby being able to separate most of the light incident on the light guide plate according to wavelength in the respective filter regions.

The above specific embodiments mainly embrace inventions having the following constructions.

A wavelength separator according to one aspect of the present invention comprises a light guide plate for emitting light incident on a side surface thereof from one principal surface; a reflective color filter arranged to intersect with an optical path of the light emerging from the principal surface and including at least two types of filter regions having different spectral characteristics; and a recycle portion arranged at a side of the light guide plate opposite to the reflective color filter, wherein, out of the light incident on the light guide plate, light reflected by the reflective color filter is returned to the reflective color filter again by being reflected by the recycle portion via the light guide plate.

According to the present invention, out of the light incident on the light guide plate, the light reflected by the reflective color filter can be returned to the reflective color filter again by being reflected by the recycle portion via the light guide plate. Thus, the light incident on the light guide plate can be efficiently separated according to wavelength in the filter regions. Further, in the present invention, a thin wavelength separator capable of emitting uniform light free from nonuniformity since light can be emitted after undergoing multiple reflections.

Accordingly, by using a planar illumination device obtained by combining the wavelength separator and a laser light source as a backlight of a liquid crystal display device and guiding rays separated according to wavelength to the corresponding pixels of a liquid crystal panel, a thin liquid crystal display device with extremely low power consumption and little luminance nonuniformity can be realized.

In the above wavelength separator, it is preferable that the reflective color filter includes two types of first and second filter regions having different spectral characteristics; and that the recycle portion is formed to reflect light reflected by the first filter region toward the second filter region.

According to the above construction, out of the light incident on the filter regions of the reflective color filter, light in disagreement with the transmission wavelength of the first filter region can be guided to the second filter region. Thus, the light incident on the light guide plate can be separated according to wavelength by being recycled without any waste.

In the above wavelength separator, it is preferable that an opposed surface of the light guide plate opposed to the one principal surface includes a deflecting groove for defecting the light incident on the side surface of the light guide plate toward the one principal surface and a flat portion for transmitting the light reflected by the reflective color filter; and that the light having passed through the flat portion is reflected by the recycle portion, incident on the light guide plate from the flat portion and emerges from the one principal surface.

According to the above construction, the light incident on the side surface of the light guide plate can be deflected toward the one principal surface by forming the deflecting groove in the bottom surface of the light guide plate, wherefore a low cost light guide plate can be realized.

In the above wavelength separator, at least one of a reflecting surface of the recycle portion, the flat portion of the light guide plate and the reflective color filter is inclined with respect to the one principal surface of the light guide plate.

According to the above construction, emergent light with high in-plane uniformity can be obtained since the light incident on the light guide plate is uniformly widened while being repeatedly reflected between the reflective color filter and the recycle portion.

In the above wavelength separator, the recycle portion is preferably formed by a reflection sheet.

According to the above construction, a cost reduction can be promoted since the incident light can be recycled by a simple construction.

In the above wavelength separator, the recycle portion is preferably formed by a polarization reflection sheet.

According to the above construction, only light of specified polarization components can be emitted even if polarization is rotated while reflection between the recycle portion and the reflective color filter is repeated.

In the above wavelength separator, the recycle portion preferably has a plurality of reflecting surfaces inclined with respect to the one principal surface of the light guide plate.

According to the above construction, light can be more efficiently recycled.

In the above wavelength separator, the reflective color filter preferably has a periodic structure whose refractive index periodically changes at intervals equal to or shorter than the wavelength of the light to be reflected.

According to the above construction, a reflective color filter having a high transmittance at a specified wavelength and high transmittance at wavelengths other than the specified wavelength can be realized, wherefore a wavelength separator with high light utilization efficiency can be realized.

In the above wavelength separator, it is preferable that the reflective color filter includes at least three optical layers laminated in an emerging direction of light from the principal surface of the light guide plate; that each of the at least three optical layers includes a reflection region formed with the periodic structure and a transmission region for transmitting light of all the wavelengths; that the periodic structures are set to have different periods for the respective optical layers so as to reflect light in different wavelength ranges for the respective optical layers; and that the reflective color filter is formed with three types of filter regions having different spectral characteristics as regions in each of which one of the transmission region and at least two of the reflection regions are laminated.

According to the above construction, light of three different wavelengths can be emitted with high light utilization efficiency while being separated in the respective filter regions.

In the above wavelength separator, it is preferable that the reflective color filter includes at least two optical layers laminated in an emerging direction of light from the principal surface of the light guide plate; that each of the at least two optical layers includes at least three types of periodic structures having different periods for reflecting at least three types of lights of different wavelengths; and that the reflective color filter is formed with three types of filter regions having different spectral characteristics as regions in each of which at least two types of periodic structures excluding one of the at least three types of periodic structures are laminated.

According to the above construction, light of three different wavelengths can be emitted with high light utilization efficiency while being separated in the respective filter regions. Further, since the number of the optical layers can be reduced according to the above construction, the number of operation steps can be reduced and a cost reduction can be promoted.

In the above wavelength separator, it is preferable that the reflective color filter is formed with the filter regions as regions in each of which a linear grating extending in a specified direction is formed as the periodic structure; and that light with aligned polarization in the form of TE polarized light is incident on the linear gratings.

According to the above construction, resonance reflection by the linear gratings can efficiently function.

In the above wavelength separator, the reflective color filter is preferably formed with the filter regions as regions in each of which a two-dimensional grating with the periodic structures arranged in two mutually orthogonal directions is formed.

According to the above construction, a degree of freedom in an arrangement place of the reflective color filter is improved since the polarization dependency of the incident light is eliminated for resonant reflection by the reflective color filter. For example, in the case of utilizing the above wavelength separator as a backlight of a liquid crystal panel, the reflective color filter can be used instead of an absorptive color filter in the liquid crystal panel, wherefore light utilization efficiency can be improved and a cost reduction can be promoted.

In the above wavelength separator, the reflective color filter is preferably constructed by laminating at least two types of thin films having different refractive indices.

According to the above construction, a reflective color filter having a high transmittance at a specific wavelength and high reflectance at wavelengths other than the specific wavelength can be realized, wherefore a wavelength separator with high light utilization efficiency can be realized. Therefore, by using the above wavelength separator, low power consuming planar illumination device and liquid crystal display device can be realized.

In the above wavelength separator, it is preferable that the reflective color filter has a laminated structure formed by alternately laminating thin films having a refractive index higher than a specified refractive index and thin films having a refractive index equal to or lower than the specified refractive index and includes a defective layer as one of a plurality of thin films constituting the laminated structure and having a thickness different for the respective filter regions and covering layers which are at least two of the plurality of thin films constituting the laminated structure and laminated at least one each on the opposite sides of the defective layer and respectively having film thicknesses equal in the filter regions.

According to the above construction, a reflective color filter including a dielectric multilayer film having a bandpass characteristic for transmitting light of specific wavelengths and reflecting light of wavelengths other than the specific wavelengths can be realized by a relatively smaller number of layers, and mass productivity is good.

In the above wavelength separator, it is preferable to further comprise at least two multilayer films including the deflective layer and the covering layers laminated at least one each on the opposite sides of the deflective layer and a connecting layer which is at least one of the plurality of thin films forming the laminated structure, provided between the at least two multilayer films and having an equal thickness in the respective filter regions; and the at least two multilayer films are preferably symmetrically structure with the deflective layer as a center.

According to the above construction, a reflective color filter with a wide transmission wavelength range can be formed by a relatively smaller number of layers. Thus, a wavelength separating structure with efficiency that does not largely vary can be realized even if errors in optical film thicknesses, an error in the incident angle or a wavelength error of the light source occurs.

It is preferable that the multilayer film is a three-layer film including the deflective layer having a refractive index equal to or lower than the specified refractive index and the covering layers respectively laminated on the opposite sides of the deflective layer; and that the laminated structure is an eleven-layer structure made up of three three-layer films and two connecting layers arranged between the adjacent ones of the three three-layer films.

According to the above construction, a wavelength separating structure with efficiency that does not largely vary can be realized even if errors in optical film thicknesses, an error in the incident angle or a wavelength error of the light source occurs.

In the above wavelength separator, it is preferable that the multilayer film is a five-layer film including the deflective layer having a refractive index higher than the specified refractive index and the covering layers laminated in twos on the opposite sides of the deflective layer; and that the laminated structure is an eleven-layer structure made up of two five-layer films and one connecting layer arranged between the five-layer films.

According to the above construction, a well-balanced wavelength separating structure can be realized by suppressing a considerable increase in the number of operation steps caused by an increase of the deflective layers while suppressing the influence of errors in optical film thicknesses, an error in the incident angle or a wavelength error of the light source.

In the above wavelength separator, the deflective layers included in the respective two five-layer films preferably have substantially equal optical film thicknesses in the filter regions.

According to the above construction, a transmittance reduction in a specified wavelength range can be suppressed.

In the above wavelength separator, the optical film thickness of each connecting layer is preferably $\lambda/4$ when a substantially central wavelength of a reflection wavelength range of each filter region is set to $\lambda$.

According to the above construction, high transmittance can be obtained for light of the specific wavelengths and high reflectance can be obtained for light of wavelengths other than the specific wavelengths.

In the above wavelength separator, the optical film thickness of each covering layer is preferably $\lambda/4$ when a substantially central wavelength of a reflection wavelength range of each filter region is set to $\lambda$.

According to the above construction, high transmittance can be obtained for light of the specific wavelengths and high reflectance can be obtained for light of wavelengths other than the specific wavelengths.

In the above wavelength separator, the deflective layer is preferably made of a material having a refractive index higher than the specified refractive index.

According to the above construction, a change of spectral efficiency in dependence on the incident angle of light on the reflective color filter can be alleviated.

In the above wavelength separator, a difference in refractive index between the thin film having a maximum refractive index and the one having a minimum refractive index out of the plurality of thin films constituting the laminated structure is preferably 0.6 or larger.

According to the above construction, it can be reduced that light of unnecessary wavelengths leaks in the respective filter regions to lead to an efficiency loss since reflection ranges of light to be reflected in the respective filter regions can be widened.

In the above wavelength separator, the reflective color filter is preferably formed on the one principal surface of the light guide plate.

According to the above construction, a thin and mass producible wavelength separator can be realized.

In the above wavelength separator, it is preferable that the reflective color filter includes three types of filter regions each having a spectral characteristic for transmitting any one of red light, green light and blue light and reflecting lights other than the light of the one color; and that the filter regions having different spectral characteristics are adjacently arranged in the reflective color filter.

According to the above construction, light of an arbitrary color can be emitted by mixing the red light, green light and blue light.

In the above wavelength separator, it is preferable that ratios of areas of the filter regions to that of the reflective color filter are set to locally differ for the respective spectral characteristics; and that a specific color distribution is displayed on an emergent surface of the reflective color filter.

According to the above construction, backlight illumination with high light utilization efficiency and low power consumption can be realized, for example, in the case of using the above wavelength separator for backlight illumination of a still image such as in a sign board since an arbitrary color distribution can be displayed on the emergent surface of the reflective color filter.

Ratios of areas of the filter regions to that of the reflective color filter are preferably set to locally differ for the respective spectral characteristics.

According to the above construction, uniform light with little luminance nonuniformity and color nonuniformity can be emitted.

In the above wavelength separator, it is preferable that the filter regions are arranged in the reflective color filter such that the different spectral characteristics are arranged in a specific order; and that a distance between the reflective color filter and the reflecting surface of the recycle portion is determined by a function of a width of the respective filter regions and the incident angle of light emerging from the principal surface of the light guide plate on the reflective color filter.

According to the above construction, since recycled light reflected by the reflective color filter can be easily guided to specified filter regions and emitted, the quantity of light that is lost while being repeatedly reflected between the reflective color filter and the recycle portion can be reduced by reducing the number of recycles by the recycle portion. Therefore, light utilization efficiency can be further improved.

In the above wavelength separator, it is preferable to further comprise a polarization reflection sheet arranged between the light guide plate and the reflective color filter.

According to the above construction, even if polarization is rotated during repeated reflections between the recycle portion and the reflective color filter, only specified polarized light components can be emitted. Thus, in the case of using the above wavelength separator, for example, as a backlight of a liquid crystal panel, there is no reduction in contrast even if an incident side polarizing plate of the liquid crystal panel is omitted since only specified polarized light components are emitted from the wavelength separator to the liquid crystal panel. Therefore, a cost reduction can be promoted.

A planar illumination device according to another aspect of the present invention comprises a light source for emitting light of at least three different wavelengths and the above wavelength separator, wherein light emitted from the light source is incident on the side surface of the light guide plate.

According to the present invention, a planar illumination device capable of performing wavelength separation while suppressing power consumption can be realized.

In the above planar illumination device, it is preferable that the light source includes laser light sources for respectively emitting red, green and blue laser light; and that the laser light of the respective wavelengths is incident on the light guide plate in the same polarization direction.

According to the above construction, a planar illumination device for emitting light of three colors with aligned polarization direction can be realized. In the case of using the above planar illumination device in a liquid crystal display device, the transmittance of light through a liquid crystal panel can be improved. Since the laser light sources each for emitting light of a single wavelength are used in the above planar illumination device, laser light can transmit through filter regions with high efficiency even if a reflective color filter having a narrow width of a transmission wavelength range is used. Further, since the laser light is used, a liquid crystal display device also having good color reproducibility can be realized in the case of using the above planar illumination device as a backlight of the liquid crystal display device.

In the above planar illumination device, it is preferable that the reflective color filter includes at least three types of filter regions having different spectral characteristics; that the three types of filter regions having the different spectral characteristics are respectively arrayed in stripes while extending in a specified first direction and being arranged in a second direction orthogonal to the first direction; and that light emitted from the light source is incident on the side surface of the light guide plate in the first direction.

According to the above construction, the parallelism of emergent light emerging from the reflective color filter is improved with respect to the direction in which the respective filter regions are arranged. Thus, light emerging from the reflective color filter can be more efficiently incident on specified subpixels in the case of using the above planar illumination device as a backlight of a liquid crystal display device, wherefore a low power consuming liquid crystal display device can be realized.

In the above planar illumination device, light emitted from the light source is preferably incident on the light guide plate along an optical path inclined by several degrees with respect to the first direction of the three types of filter regions.

According to the above construction, light can be emitted while being separated according to wavelength by a smaller number of recycles since the re-incidence of light reflected by the reflective color filter and the recycle portion on the reflective color filter can be suppressed. Thus, even a slight efficiency loss during recycle reflections can be suppressed and an extremely low power consuming planar illumination device can be realized.

A liquid crystal display device according to still another aspect of the present invention comprises a liquid crystal panel including a plurality of subpixels for transmitting light of specific wavelengths and a backlight illumination device for illuminating the liquid crystal panel from behind, wherein the above planar illumination device is used as the backlight illumination device.

According to the above construction, an image free from luminance nonuniformity can be displayed and a low power consuming, mass productive and thin liquid crystal display device can be realized.

A liquid crystal display device according to further another aspect of the present invention comprises a light source for emitting light of at least three different wavelengths, a wavelength separator for separating light from the light source according to wavelength; and a liquid crystal panel on which light emitted from the wavelength separator is incident from behind, wherein the liquid crystal panel includes a plurality of subpixels for transmitting light of specific wavelengths and an inner polarizing plate disposed between the plurality of subpixels and the light guide plate, and an axis along extending directions of linear gratings of the reflective color filter and a transmission axis of the inner polarizing plate are located on the same plane.

According to the present invention, an image free from luminance nonuniformity can be displayed and a low power consuming, mass productive and thin liquid crystal display device can be realized. Further, according to the present invention, an efficiency loss in the inner polarizing plate of the liquid crystal panel can be reduced and a liquid crystal display device with high light utilization efficiency can be realized.

In the above liquid crystal display device, the extending directions of the linear gratings coincide in all optical layers of the reflective color filter.

According to the above construction, light utilization efficiency can be improved since light emitted from the light source can be incident as TE polarized light on all the optical layers.

In the above liquid crystal display device, it is preferable that the plurality of subpixels include RGB subpixels for individually transmitting red light, green light and blue light; and that the planar illumination device emits light emitted from the light source while separating it into red, green and blue lights so that the lights of the corresponding colors are substantially perpendicularly incident on the RGB subpixels.

According to the above construction, a low power consuming liquid crystal display device can be realized since red, green and blue lights separated according to wavelength can be efficiently guided to the RGB subpixels of the liquid crystal panel. Further, since the lights perpendicularly pass through the RBG subpixels of the liquid crystal panel in the above construction, contrast can be increased.

In the above liquid crystal display device, it is preferable that the liquid crystal panel includes a first glass substrate; and that the reflective color filter is formed on a second glass substrate made of the same material as the first glass substrate.

According to the above construction, displacements of the positions of the respective subpixels of the liquid crystal panel and the positions of the respective filter regions of the reflective color filter due to thermal expansion can be suppressed.

In the above liquid crystal display device, it is preferable that the second glass substrate constitutes the light guide plate; that the reflective color filter is formed on one principal surface of the light guide plate; that the light guide plate further includes a resin-made deflecting portion provided on a surface thereof opposed to the surface where the reflective color filter is formed; and that the deflecting portion deflects light incident on the side surface of the light guide plate toward the one principal surface.

According to the above construction, it is possible not only to suppress displacements of the positions of the respective subpixels of the liquid crystal panel and the positions of the respective filter regions of the reflective color filter due to thermal expansion, but also to use the second glass substrate for forming the reflective color filter as the light guide plate. Therefore, the liquid crystal display device can have a thin construction.

In the above liquid crystal display device, it is preferable that the liquid crystal panel includes an inner glass substrate disposed between the plurality of subpixels and the light guide plate; and that the reflective color filter is disposed between the inner glass substrate and the light guide plate.

According to the above construction, a cost reduction can be promoted since a glass substrate only designed to form the reflective color filter can be dispensed with.

In the liquid crystal display device, it is preferable that the liquid crystal panel includes an inner glass substrate disposed between the plurality of subpixels and the light guide plate; and that the reflective color filter is disposed between the inner glass substrate and the subpixels.

According to the above construction, a glass substrate only designed to form the reflective color filter can be dispensed with. Further, according to the above construction, light separated according to wavelength can be more efficiently incident on the respective subpixels since the reflective color filter and the respective subpixels can be located closer to each other.

In the above liquid crystal display device, the liquid crystal panel preferably further includes a diffusion sheet for diffusing light emerging from the plurality of subpixels.

According to the above construction, a liquid crystal display device with high contrast when seen in an oblique direction can be realized since an image with high luminance and a wide viewing angle can be displayed.

In the above liquid crystal display device, the liquid crystal panel preferably further includes a structure sheet formed with tapered microscopic photoconductors for diffusing light emerging from the plurality of subpixels.

According to the above construction, an image with little luminance nonuniformity and a wide viewing angle can be displayed and a liquid crystal display device with a good light contrast ratio can be realized.

In the above liquid crystal display device, the liquid crystal panel preferably further includes a structure sheet formed with ball-shaped microscopic photoconductors for diffusing light emerging from the plurality of subpixels.

According to the above construction, an image with little luminance nonuniformity and a wide viewing angle can be displayed and a liquid crystal display device with a good light contrast ratio can be realized.

In the above liquid crystal display device, it is preferable that the liquid crystal panel includes an outer glass substrate disposed at a side of the plurality of subpixels opposite to the light guide plate and an outer polarizing plate disposed on a surface of the outer glass substrate opposite to the subpixels; and that a thickness sum L of the outer glass substrate and the outer polarizing plate is equal to or smaller than a thickness determined by a function of a varying angle $\phi$ of emergent light in the outer glass substrate and a width P of the plurality of subpixels and satisfies $L<P/\tan\phi$.

According to the above construction, even if an emergent angle of light emerging from the respective subpixels varies in a construction for diffusing light emerging from the respective subpixels, image blurring on the liquid crystal panel can be suppressed.

In the liquid crystal display device, it is preferable that the liquid crystal panel includes an outer glass substrate disposed at a side of the plurality of subpixels opposite to the light guide plate; and that a refractive index of the outer glass substrate is larger than that of the light guide plate.

According to the above construction, since the refractive index of the outer glass substrate is set larger than that of the light guide plate, an apparent variation of the emergent angle of light from the outer glass substrate can be made smaller and image blurring can be suppressed even if the emergent angle of the light from the light guide plate varies.

According to the present invention, low power consuming and thin wavelength separator, planar display device and liquid crystal display device can be usefully realized by simple constructions since laser light incident on the light guide plate can be uniformly incident on the respective pixels of the liquid crystal panel without any luminance nonuniformity.

Further, the present invention is useful since it is possible to realize a mass producible planar display device and a liquid crystal display device with good color reproducibility, high luminance and a wide viewing angle.

What is claimed is:

1. A liquid crystal display device, comprising:
    a light source for emitting light of at least two different wavelengths;
    a light guide plate for emitting light from one principal surface, the light being incident on a side surface of the light guide plate from the light source;
    a reflective color filter arranged to intersect with an optical path of the light emerging from the principal surface and including at least two types of filter regions having different spectral characteristics, each type of filter region being operable to transmit light having a corresponding one of the at least two different wavelengths;
    a recycle portion arranged at a side of the light guide plate opposite to the reflective color filter; and
    a liquid crystal panel including a plurality of subpixels for respectively transmitting light having a corresponding one of the at least two different wavelengths, an outer glass substrate disposed at a side of the plurality of subpixels opposite to the light guide plate, and an inner glass substrate disposed between the plurality of subpixels and the light guide plate;
    wherein,
    out of the light incident on the light guide plate, light reflected by the reflective color filter is returned to the reflective color filter again by being reflected by the recycle portion via the light guide plate, and
    the subpixels of the liquid crystal panel and the filter regions of the reflective color filter are provided between the outer glass substrate and the inner glass substrate, and are arranged in such a manner that light separated by the reflective color filter is incident on specified subpixels.

2. The liquid crystal display device according to claim 1, wherein,
    the reflective color filter having two types of filter regions includes first and second filter regions having different spectral characteristics, and
    the recycle portion is formed to reflect light reflected by the first filter region toward the second filter region.

3. The liquid crystal display device according to claim 1, wherein,
    an opposing surface of the light guide plate is opposed to the one principal surface and includes a deflecting groove for deflecting the light incident on the side surface of the light guide plate toward the one principal surface and a flat portion for transmitting the light reflected by the reflective color filter, and the light having passed through the flat portion is reflected by the recycle portion, incident on the light guide plate from the flat portion and emerges from the one principal surface.

4. The liquid crystal display device according to claim 3, wherein at least one of a reflecting surface of the recycle portion, the flat portion of the light guide plate and the reflective color filter is inclined with respect to the one principal surface of the light guide plate.

5. The liquid crystal display device according to claim 1, wherein the recycle portion is formed by a reflection sheet.

6. The liquid crystal display device according to claim 5, wherein the recycle portion is formed by a polarization reflection sheet.

7. The liquid crystal display device according to claim 1, wherein the recycle portion has a plurality of reflecting surfaces inclined with respect to the one principal surface of the light guide plate.

8. The liquid crystal display device according to claim 1, wherein the reflective color filter has a periodic structure whose refractive index periodically changes at intervals equal to or shorter than the wavelength of the light to be reflected.

9. The liquid crystal display device according to claim 8, wherein,
the reflective color filter includes at least three optical layers laminated in an emerging direction of light from the principal surface of the light guide plate,
each of the at least three optical layers includes a reflection region formed with the periodic structure and a transmission region for transmitting light of all the wavelengths,
the periodic structures are set to have different periods for the respective optical layers so as to reflect light in different wavelength ranges for the respective optical layers, and
the reflective color filter is formed with three types of filter regions having different spectral characteristics as regions in each of which one of the transmission region and at least two of the reflection regions are laminated.

10. The liquid crystal display device according to claim 8, wherein,
the reflective color filter includes at least two optical layers laminated in an emerging direction of light from the principal surface of the light guide plate,
each of the at least two optical layers includes at least three types of periodic structures having different periods for reflecting at least three types of lights of different wavelengths, and
the reflective color filter is formed with three types of filter regions having different spectral characteristics as regions in each of which at least two types of periodic structures excluding one of the at least three types of periodic structures are laminated.

11. The liquid crystal display device according to claim 8, wherein,
the reflective color filter is formed with the filter regions as regions in each of which a linear grating extending in a specified direction is formed as the periodic structure, and
light with aligned polarization in the form of TE polarized light is incident on the linear gratings.

12. The liquid crystal display device according to claim 11, wherein:
the light source emits light of at least three different wavelengths,
light emitted from the light guide plate is incident on the liquid crystal panel from behind, and
the liquid crystal panel includes:
an inner polarizing plate disposed between the plurality of subpixels and the light guide plate; and
an axis along extending directions of linear gratings of the reflective color filter and a transmission axis of the inner polarizing plate are located on the same plane.

13. The liquid crystal display device according to claim 12, wherein the extending directions of the linear gratings coincide in all optical layers of the reflective color filter.

14. The liquid crystal display device according to claim 8, wherein the reflective color filter is formed with the filter regions as regions in each of which a two-dimensional grating with the periodic structures arranged in two mutually orthogonal directions is formed.

15. The liquid crystal display device according to claim 8, wherein the reflective color filter has a laminated structure formed by alternately laminating thin films having a refractive index higher than a specified refractive index and thin films having a refractive index equal to or lower than the specified refractive index and includes a defective layer as one of a plurality of thin films constituting the laminated structure and having a thickness different for the respective filter regions and covering layers which are at least two of the plurality of thin films constituting the laminated structure and laminated such that each is located on opposite sides of the defective layer and respectively having film thicknesses equal in the filter regions.

16. The liquid crystal display device according to claim 15, wherein,
the reflective color filter includes at least two multilayer films including the deflective layer and the covering layers laminated such that each are located on the opposite sides of the deflective layer and a connecting layer which is at least one of the plurality of thin films forming the laminated structure, provided between the at least two multilayer films and having an equal thickness in the respective filter regions, and
the at least two multilayer films are symmetrically structure with the deflective layer as a center.

17. The liquid crystal display device according to claim 16, wherein,
the multilayer film is a three-layer film including the deflective layer having a refractive index equal to or lower than the specified refractive index and the covering layers respectively laminated on the opposite sides of the deflective layer, and
the laminated structure is an eleven-layer structure made up of three three-layer films and two connecting layers arranged between the adjacent ones of the three three-layer films.

18. The liquid crystal display device according to claim 16, wherein,
the multilayer film is a five-layer film including the deflective layer having a refractive index higher than the specified refractive index and the covering layers laminated in twos on the opposite sides of the deflective layer, and
the laminated structure is an eleven-layer structure made up of two five-layer films and one connecting layer arranged between the five-layer films.

19. The liquid crystal display device according to claim 18, wherein the deflective layers included in the respective two five-layer films have substantially equal optical film thicknesses in the filter regions.

20. The liquid crystal display device according to claim 16, wherein the optical film thickness of each connecting layer is $\lambda/4$ when a substantially central wavelength of a reflection wavelength range of each filter region is set to $\lambda$.

21. The liquid crystal display device according to claim 15, wherein the optical film thickness of each covering layer is $\lambda/4$ when a substantially central wavelength of a reflection wavelength range of each filter region is set to $\lambda$.

22. The liquid crystal display device according to claim 15, wherein the deflective layer is made of a material having a refractive index higher than the specified refractive index.

23. The liquid crystal display device according to claim 1, wherein the reflective color filter is constructed by laminating at least two types of thin films having different refractive indices.

24. The liquid crystal display device according to claim 23, wherein a difference in refractive index between the thin film having a maximum refractive index and the one having a minimum refractive index out of the plurality of thin films constituting the laminated structure is 0.6 or larger.

25. The liquid crystal display device according to claim 1, wherein,
the reflective color filter includes three types of filter regions each having a spectral characteristic for transmitting any one of red light, green light and blue light and reflecting lights other than the light of one of red light, green light and blue light, and
the filter regions having different spectral characteristics are adjacently arranged in the reflective color filter.

26. The liquid crystal display device according to claim 1, wherein
ratios of areas of the filter regions of the reflective color filter are set to locally differ for the respective spectral characteristics, and
a specific color distribution is displayed on an emergent surface of the reflective color filter.

27. The liquid crystal display device according to claim 1, wherein ratios of areas of the filter regions of the reflective color filter are set to locally differ for the respective spectral characteristics.

28. The liquid crystal display device according to claim 1, wherein,
the filter regions are arranged in the reflective color filter such that the different spectral characteristics are arranged in a specific order, and
a distance between the reflective color filter and the reflecting surface of the recycle portion is determined by a function of a width of respective filter regions and the incident angle of light emerging from the principal surface of the light guide plate on the reflective color filter.

29. The liquid crystal display device according to claim 1, further comprising:
a polarization reflection sheet arranged between the light guide plate and the reflective color filter.

30. The liquid crystal display device according to claim 1, wherein,
the light source emits light of at least three different wavelengths.

31. The liquid crystal display device according to claim 30, wherein,
the light source includes laser light sources for respectively emitting red, green and blue laser light, and
the laser light of the respective wavelengths is incident on the light guide plate in the same polarization direction.

32. The liquid crystal display device according to claim 30, wherein,
the reflective color filter includes at least three types of filter regions having different spectral characteristics,
the three types of filter regions having the different spectral characteristics are respectively arrayed in stripes while extending in a specified first direction and being arranged in a second direction orthogonal to the first direction, and
light emitted from the light source is incident on the side surface of the light guide plate in the first direction.

33. The liquid crystal display device according to claim 32, wherein light emitted from the light source is incident on the light guide plate along an optical path inclined by several degrees with respect to the first direction of the three types of filter regions.

34. The liquid crystal display device according to claim 1, wherein,
the plurality of subpixels include RGB subpixels for individually transmitting red light, green light and blue light, and
the reflective color filter emits light emitted from the light source while separating it into red, green and blue lights so that the lights of the corresponding colors are substantially perpendicularly incident on the RGB subpixels.

35. The liquid crystal display device according to claim 1, wherein the reflective color filter is formed on the inner glass substrate made of a same material as the outer glass substrate.

36. The liquid crystal display device according to claim 1, wherein the reflective color filter is disposed between the inner glass substrate and the subpixels.

37. The liquid crystal display device according to claim 1, wherein the liquid crystal panel further includes a diffusion sheet for diffusing light emerging from the plurality of subpixels.

38. The liquid crystal display device according to claim 37, wherein,
the liquid crystal panel includes an outer polarizing plate disposed on a surface of the outer glass substrate opposite to the subpixels, and
a thickness sum L of the outer glass substrate and the outer polarizing plate is equal to or smaller than a thickness determined by a function of a varying angle $\phi$ of emergent light in the outer glass substrate and a width P of the plurality of subpixels and satisfies $L < P/\mathrm{Tan}\,\phi$.

39. The liquid crystal display device according to claim 37, wherein a refractive index of the outer glass substrate is larger than that of the light guide plate.

40. The liquid crystal display device according to claim 1, wherein the liquid crystal panel further includes a structure sheet formed with tapered microscopic photoconductors for diffusing light emerging from the plurality of subpixels.

41. The liquid crystal display device according to claim 1, wherein the liquid crystal panel further includes a structure sheet formed with ball-shaped microscopic photoconductors for diffusing light emerging from the plurality of subpixels.

* * * * *